US005550967A

United States Patent [19]

Brewer et al.

[11] Patent Number: 5,550,967
[45] Date of Patent: Aug. 27, 1996

[54] METHOD AND APPARATUS FOR GENERATING AND DISPLAYING VISUAL CUES ON A GRAPHIC USER INTERFACE

[75] Inventors: Gregory S. Brewer, Pleasanton; Peter Commons, Mountain View, both of Calif.

[73] Assignee: Apple Computer, Inc., Cupertino, Calif.

[21] Appl. No.: 529,669

[22] Filed: Sep. 18, 1995

Related U.S. Application Data

[63] Continuation of Ser. No. 56,367, Apr. 30, 1995, abandoned, which is a continuation-in-part of Ser. No. 10,062, Jan. 27, 1993, Pat. No. 5,488,685.

[51] Int. Cl.⁶ ........................................... G06F 3/00
[52] U.S. Cl. ............................... 395/155; 395/157
[58] Field of Search ...................... 395/155, 157, 395/159, 161

[56] References Cited

U.S. PATENT DOCUMENTS

| Re. 32,632 | 3/1988 | Atkinson | 340/709 |
|---|---|---|---|
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,648,062 | 3/1987 | Johnson et al. | 395/157 |
| 4,689,737 | 8/1987 | Grant | 364/200 |
| 4,748,618 | 5/1988 | Brown et al. | 370/94 |
| 4,772,882 | 9/1988 | Mical | 340/709 |
| 4,785,408 | 11/1988 | Britton et al. | 364/513.5 X |
| 4,812,834 | 3/1989 | Wells | 340/721 |
| 4,831,556 | 5/1989 | Oono | 364/521 |
| 4,847,604 | 7/1989 | Doyle | 340/706 |
| 4,884,223 | 11/1989 | Ingle et al. | 364/550 |
| 4,899,136 | 2/1990 | Beard et al. | 340/706 |
| 4,899,377 | 2/1990 | Bauer et al. | 379/354 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,939,508 | 7/1990 | Lawrence et al. | 395/159 X |
| 4,961,070 | 10/1990 | Maher et al. | 395/156 |
| 5,050,105 | 9/1991 | Peters | 395/157 |
| 5,062,060 | 10/1991 | Kolnic | 395/159 X |
| 5,072,412 | 12/1991 | Henderson et al. | 395/159 |
| 5,148,154 | 9/1992 | MacKay | 340/712 |
| 5,155,806 | 10/1992 | Hoeber et al. | 395/157 |
| 5,157,763 | 10/1992 | Peters et al. | 395/157 |
| 5,157,768 | 10/1992 | Hoeber et al. | 395/157 |
| 5,179,654 | 1/1993 | Richards et al. | 395/157 |
| 5,287,448 | 2/1994 | Nicol et al. | 395/159 X |

FOREIGN PATENT DOCUMENTS

| 0239884 | 10/1987 | European Pat. Off. . |
|---|---|---|
| 0325443 | 7/1989 | European Pat. Off. . |
| 0342964 | 11/1989 | European Pat. Off. . |
| 0428261 | 5/1991 | European Pat. Off. . |
| WO92/08184 | 5/1992 | WIPO . |

OTHER PUBLICATIONS

IBM's Technical Disclosure Bulletin, vol. 34, No. 8 (Jan. 1992), pp. 208–209.

(List continued on next page.)

*Primary Examiner*—Heather R. Herndon
*Assistant Examiner*—Cliff N. Vo
*Attorney, Agent, or Firm*—Blakely, Sokoloff, Taylor & Zafman

[57] ABSTRACT

A user interface includes an object oriented graphic user interface having overlapping windows and provides an access window having topics, index and look for button functions for selection by a user. Through the use of the topics, index or look for functions, a help inquiry is defined. To assist the user, visual cues in the form of coach marks are generated for identifying features on the display. The coach marks are rendered such that they appear animated as if drawn by hand and appear to approximate a geometric object, such as an arrow, a circle, an X, and the like. The coach marks encircle, point to, and/or underline objects, features, icons, folders and other display elements to assist the user in operating the computer system.

48 Claims, 33 Drawing Sheets

OTHER PUBLICATIONS

Alexander, Visualizing cleared-off desktops, *Computerworld*, May 6, 1991, p. 20.

Hiroshi Ishii, Kazuho Arita, Clearface: Translucent Multiuser Interface for Team WorkStation, *ECSCW*, Sep., 1991, pp. 6–10.

Hiroshi Ishii, Naomi Miyaka, Toward an Open Shared Workspace, *Communications of the ACM*, Dec., 1991, vol. 34, No. 12, pp. 37–50.

Article entitled: Learning Considerations in User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time–Driven Multimedia Documents; authors: Stavros Christodoulakis and Steven Graham; publication of the Institute for Computer Research, University of Waterloo, Waterloo, Ontario, Canada, Jul., 1988.

PCT International Search Report for PCT International Application No. PCT/US94/00919.

PCT International Search Report for PCT International Application No. PCT/US94/00912.

*Macintosh Reference System 7*, Apple Computer, pp. 30–31.

"Non–Verbal Animated Help Screen Function", *IBM Technical Disclosure Bulletin*, vol. 34, No. 8, pp. 208–209 (Jan. 1992).

"OS/2: Contextual Animated–Open Window Control," *IBM Techical Disclosure Bulletin*, vol. 34, No. 11, pp. 68–69 (Apr. 1992).

"Presenting Messages on an Object That is Not Currently Being Worked On," *IBM Technical Disclosure Bulletin*, vol. 35, No. 6, pp. 99–101 (Nov. 1992).

Cowart, R., *Mastering Windows 3.1*, Sybex Inc., Alameda, CA, pp. xxxiv, 31–36, 67, and 114–115 (1993).

Ten pages of Microsoft Windows Tutorial.

HyperCard® Basics Manual and 3.5" Diskette containing HyperCard® Program Version 2.1, Apple Computer, Inc. (1991).

Goodman, D., *The Complete HyperCard Handbook*, Bantam Books, Inc., pp. 34–39 (1987).

"Improved Method for Help Lookups," *IBM Technical Disclosure Bulletin*, vol. 29, No. 1, pp. 291–292 (Jun. 1986).

*Systems Application Architeture, Common User Access: Advanced Interface Design Guide*, IBM, pp. 59–61, 89–91 (1st Ed., Jun. 1989).

*The Worksheet Utilities*, Funk Software, Inc., Cambridge, MA, pp. 10–20, 48–60 (1st Ed., Jan. 1988).

28 pages of screen images of WordPerfect® for Windows, Version 5.1, WordPerfect Corp. (Apr. 1992).

Seven pages of screen images of Microsoft Windows Program Manager, Version 3.1, Microsoft Corp. (1992).

START POINT        FIG. 38(a)        END POINT

START POINT        FIG. 38(b)        END POINT

FIG. 38(c)        END POINT

METHOD AND APPARATUS FOR GENERATING AND DISPLAYING VISUAL CUES ON A GRAPHIC USER INTERFACE

This is a continuation of application Ser. No. 08/056,367, filed Apr. 30, 1995, now abandoned which is a continuation-in-part of application Ser. No. 08/010,062, filed Jan. 27, 1993, now U.S. Pat. No. 5,488,685.

A portion of the disclosure if this patent document contains material, such as illustrations of graphical user interface images, which is protected by copyrights owned by the assignee of the present invention. The assignee hereby reserves it rights, including copyrights, in these materials, and each such material should be regarded as bearing the following notice: Copyright Apple Computer, Inc. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

The present invention relates to apparatus and methods for displaying graphic information, and more particularly, the present invention relates to a computer controlled display system for displaying and generating visual cues on a graphic user interface of a display.

2. Art Background

Over the past decade, a variety of graphic user interfaces have been developed to ease human interaction with computer systems. Many user interfaces utilize metaphors in the design of the interface as a way of maximizing human familiarity, and conveying information between the user and computer. Through the use of familiar metaphors, such as desk tops, notebooks and the like, the interface takes advantage of existing human mental structures to permit a user to draw upon the metaphor analogy to understand the requirements of the particular computer system. It is well known that designing around a familiar metaphor helps reduce human learning time. See for example, Patrick Chan "*Learning Considerations in User Interface Design: The Room Model*", Report CS-84-16, University of Waterloo Computer Science Department, Ontario, Canada, July, 1984, and references cited therein.

In current generation systems, it is common for computer systems to incorporate so-called "object oriented" display systems which utilize multiple "windows" on a display in which combinations of text and graphics are disposed. Using a desk top metaphor, the windows may take the form of a variety of objects, such a file folders, loose leaf binders, or simple rectangles, and the windows may overlap one another with the "top" window constituting the current work file. A user operating within the context of a window-based graphic user interface ("GUI") operates on objects commonly found in an office, and therefore, provides non expert users with a familiar surrounding in which to interact with the computer.

In a typical window-based GUI system, visually distinct display objects are provided on the display screen, and are commonly referred to as "icons". Each of the icons represents a function or object on the desktop. In many systems, a cursor is also displayed which may be selectively moved in response to the movement of a mouse or other pointer control device. The cursor may be moved over display objects which the user may select on the screen. The user may delete information from a window, move data from one window to another, and generally operate on the windows as if an actual file or other physical object is being manipulated. A variety of "pull-down" menus also may be displayed, using a technique for selecting particular command options appearing along a menu bar, and subcommand items corresponding to the command options (See U.S. Pat. No. Re. 32,632).

The reader is referred to the following references which describe various aspects, methods and apparatus associated with prior art graphic user interface design: U.S. Pat. No. Re. 32,632, U.S. Pat. No. 4,931,783, U.S. Pat. No. 5,072,412, and U.S. Pat. No. 5,148,154, and the references cited therein.

Although object oriented display systems have shortened the learning and acclamation period of a new user in understanding and operating computer systems, users still require assistance during the actual operation of the computer system. As a result, a variety of on-screen help systems have been developed using window-based graphic user interfaces. Some systems provide a help key which displays on-screen manuals for the reader to review while operating in the particular application program. Other help based systems, such as the Balloon help system which forms a part of System 7.0 of the Apple Macintosh® graphic user interface, provides context sensitive help information by placing the cursor over various icons, labels, windows and other objects on the screen desktop. (See Macintosh® user manuals published by Apple Computer, Inc.)

An intuitive help interface design, as in the case of graphic user interfaces generally, relies on a real world metaphor to permit users to apply common knowledge about the metaphor and operate the computer system. However, it is difficult to define what constitutes an "intuitive" design for a user interface, and it is difficult to design an interface that is completely apparent to all end users, no matter which metaphor is used. As a result, it is desirable to provide a help system which is context sensitive and works in conjunction with the graphic user interface metaphor to assist the user.

As will be described, the present invention provides an on-screen help system having attributes which ease the acclamation and learning period of the user. Window features are displayed which provide visual cues to coach the user through the use of help to accomplish the desired function. Although the present invention is described in terms of an on-screen help system in a window-based graphic user interface, it will be apparent from the description below, that the present invention's features and attributes have application in a variety of graphic user interface designs and software applications. Accordingly, the present invention is not limited by the following description, and it will be understood by those skilled in the art, that the present invention may be applied to computer systems offered by a variety of manufacturers, and to user interface designs which utilize a variety of metaphors.

SUMMARY OF THE INVENTION

The present invention provides apparatus and methods for a help interface for use in a window-based computer display system. The display system includes at least one central processing unit (CPU) which is coupled through appropriate input/output (I/O) circuitry to input devices, such as a keyboard, digital pad, mouse and/or track ball. The CPU is coupled to a hard disk drive for the storage of programs and data, and may also be coupled to a network through which the CPU may communicate with a variety of other system resources and devices. The CPU is further coupled to a display device such as a CRT or liquid crystal display, on which the present invention is displayed. The user interface of the present invention includes an object oriented graphic user interface having overlapping windows. The present invention includes an access window having topics, index and look for button functions for selection by a user. To further assist the user, the present invention includes coach mark visual cues generated by the CPU for identifying features on the display which relate to the information disposed within the presentation window. The coach marks are displayed generally concurrently with the display of help information, and appear to approximate a geometric object, such as, for example, an arrow, a circle, an X, and the like. The coach marks encircle, point to, and/or underline objects, features, icons, folders and other display elements to assist the user in operating the computer system. In the present embodiment, the coach marks are rendered such that they appear on the display as if drawn by hand, by both shape (imperfect geometry), and by speed in approximating the speed in which a human would draw such shapes. The marks may be in color, or black and white, depending on the capability of the particular computer display system. The present invention includes apparatus and methods for generating and displaying the coach marks, such that they appear to be drawn by a human on the interface.

BRIEF DESCRIPTION OF THE DRAWINGS

FIGS. 38(a), 38(b), 38(c), and 38(d), conceptually illustrate the rendering of an underline coach mark by the present invention.

NOTATION AND NOMENCLATURE

Figure 1:
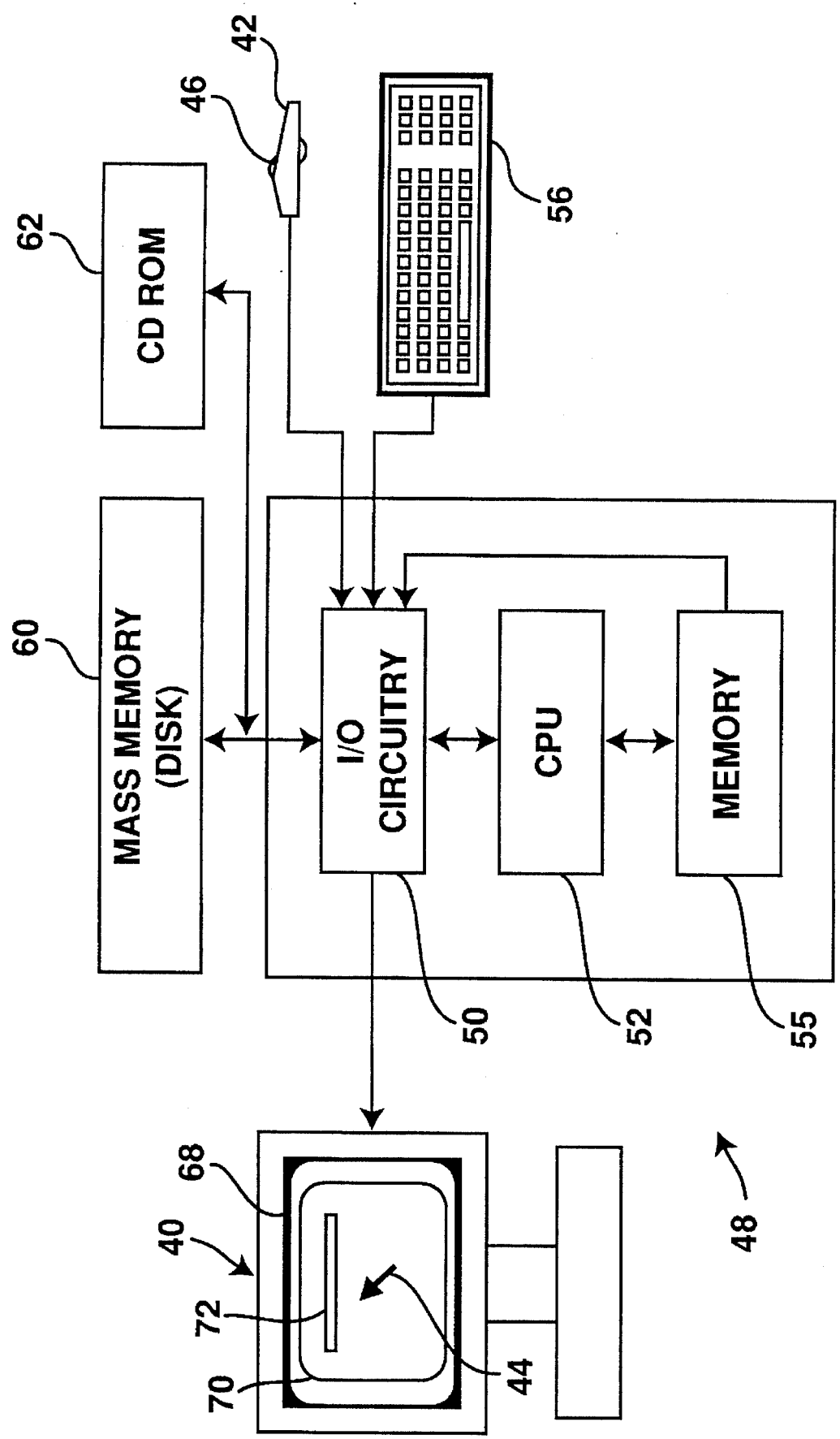
FIG. 1 is a functional block diagram illustrating one possible computer display system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Apple Computer, Inc., as well as other manufacturers of computer systems.

DETAILED DESCRIPTION OF THE INVENTION

The following detailed description will be divided into several sections. The first of these will describe a general system arrangement for generating computer graphics in accordance with the teachings of the present invention. Subsequent sections will deal with aspects of the present invention such as the present invention's help access methods and presentation window, alpha slider selection method, floating windows, and computer generated visual cues (referred to as "coach marks"), as well as the overall structure and operation of the present invention's use of coach marks. The reader is referred to the following Specifications for additional information, which are incorporated by reference: Ser. No. 08/010,063, Filed Jan. 27, 1993, entitled "Method And Apparatus For Providing A Help Based Window System Using Multiple Access Methods"; Ser. No. 08/010,061, Filed Jan. 27, 1993, entitled "Method and Apparatus For Displaying And Scrolling Data In A Window-Based Graphic User Interface"; and Ser. No. 08/010,064, Filed Jan. 27, 1993, entitled "Method And Apparatus For Presenting Information In A Display Using Floating Windows.

In addition, in the following description, numerous specific details are set forth such as functional blocks representing data processing devices, metaphors, such as desktop and window metaphors, window configurations and arrangements, etc. in order to provide a thorough understanding of the present invention. However, it will be apparent to one skilled in the art that the present invention may be practiced without the specific details. In other instances, well known circuits and structures are not described in detail so as not to obscure the present invention unnecessarily.

General System Configuration

The computer controlled display system of the present invention is part of a computer system, such as that illustrated in FIG. 1. The computer controlled display system includes a display means 40, such as a CRT monitor or a liquid crystal display (LCD), and further includes a cursor control means 42, such as a mouse of the type shown in U.S. Pat. No. Re. 32,632, a track ball, joy stick or other device for selectively positioning a cursor 44 on a display screen 68 of the display 40. Typically, the cursor control means 42 includes a signal generation means, such as a switch 46 having a first position and a second position. For example, the mouse shown and described in U.S. Pat. No. Re. 32,632 includes a switch which the user of the computer system uses to generate signals directing the computer to execute certain commands. As illustrated, the cursor control means 42 (hereinafter all types of applicable cursor control devices, such as mice, track balls, joy sticks, graphic tablets, keyboard inputs, and the like, are collectively referred to as the "mouse 42") is coupled to a computer system 48.

The computer 48 comprises three major components. The first of these is an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

Also shown in FIG. 1 is a keyboard 56 to input data and commands into the computer 48, as is well known in the art. A magnetic mass memory disk 60 is shown coupled to I/O circuit 50 to provide additional storage capability for the computer 48. In addition, a CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

As illustrated in FIG. 1, the display 40 includes the display screen 68 in which a window 70 is displayed. As is well known in the art, the window 70 may be in the form of a rectangle or other well known shape, and may include a menu bar 72 disposed horizontally across the length of the window. As is well known, the movement of the mouse 42 may be translated by the computer 48 into movement of the cursor 44 on the display screen 70. The reader is referred to literature cited in the background describing object-oriented display systems generally, and in particular, desktop metaphor window-based systems for additional description related to other computer systems which may be utilized in accordance with the teachings of the present invention. The system illustrated in FIG. 1 is intended to represent a general data processing system capable of providing a graphic user interface display. The window display 70 and window based display system shown in FIG. 1 is well known (for example, the Macintosh® series of computers sold by Apple Computer, Inc.), and hence, a detailed description is not necessary herein. In operation, the window based user interface of the present invention is generated and displayed using software stored in memory 55 and executed by the CPU 52, as is known.

Access And Presentation Windows

Figure 2:
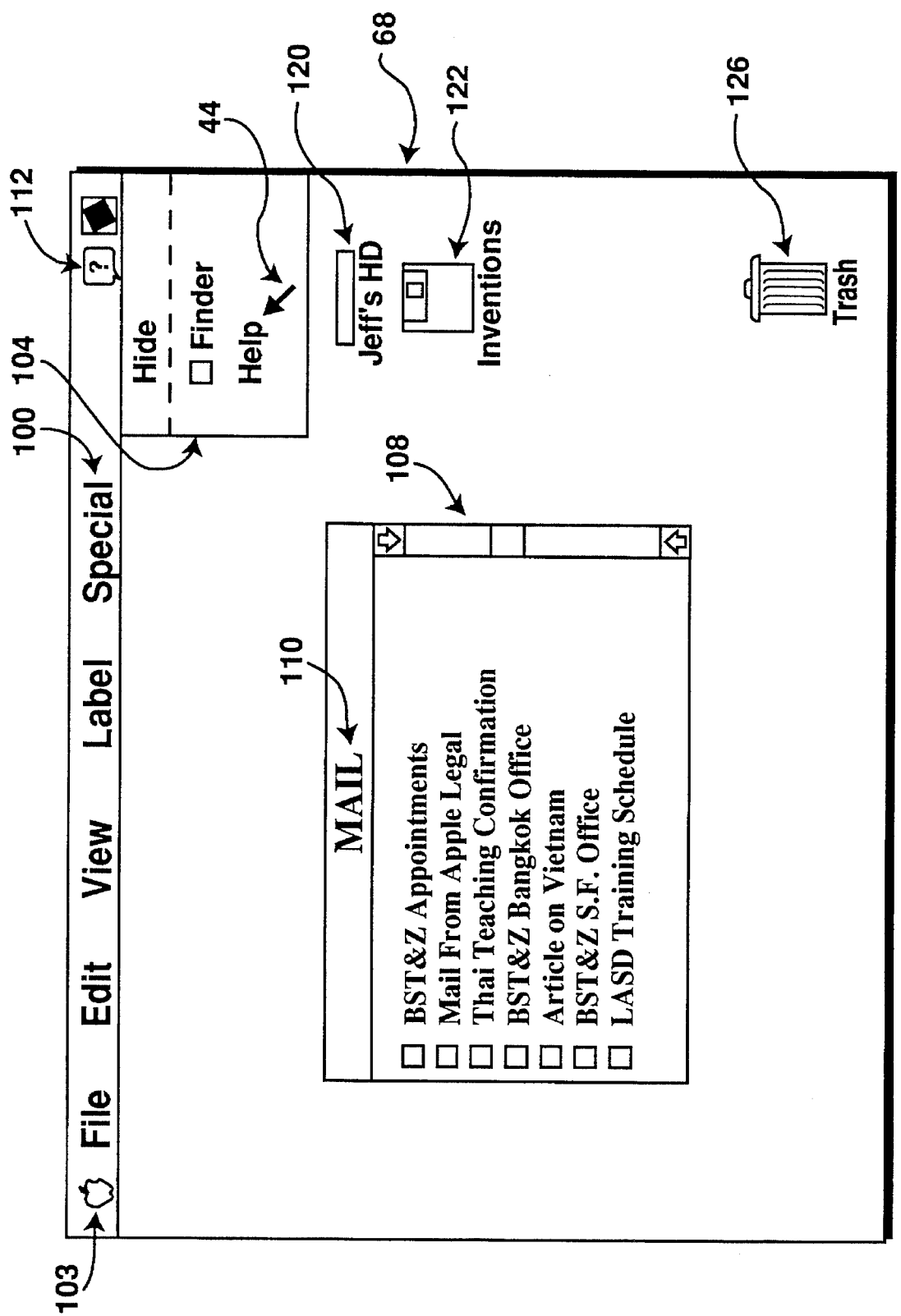
FIG. 2 shows a representative display screen illustrating a window-display system utilizing the teachings of the present invention.

Referring now to FIG. 2, the display screen 68 of the display 40 is shown in additional detail. Illustrated within the display 68, is a known graphic user interface utilized by computers manufactured and sold by Apple Computer, Inc. A menu bar 100 is provided which horizontally spans the display screen 68. As shown in FIG. 2 the menu bar 100 typically includes a plurality of command options such as a desktop icon in the shape of an Apple 103, "File", "Edit", "View ", "Label ", and "Special". Using the teachings of U.S. Pat. No. Re. 32,632 and U.S. Pat. No. 4,931,783, pull down menus may be displayed and selected using a methodology commonly referred to as a "push-drag-release" method. Using this methodology, the cursor 44 is placed over a desired command option, after which the switch 46 of the mouse 42 is depressed. The depression of the switch 46 signals the CPU 52 to generate a pull down menu (In FIG. 2, a sample pull down menu is shown as menu 104.). Moving the mouse 42, and maintaining the switch 46 in a depressed state, the user places the cursor 44 over a desired subcommand item (in the example of FIG. 2, the "help" command), and releases the switch 46. The computer system 48 then executes the selected subcommand item. As will be described, the selection of the subcommand item "help" in menu 104 results in the CPU executing the help system disclosed herein. In addition, for purposes of this Specification and the description which follows, a reference to placing the cursor 44 "over" an object, icon, list, question or the like, shall be understood to mean placing the cursor 44 over at least a portion of the object, icon, list, question or the like sufficient to identify the selection to the CPU 52.

Shown within the desktop illustrated in FIG. 2 is a window 108 which includes a header 110 entitled "Mail". In the example illustrated, the window 108 lists a variety of documents, messages and the like, which are disposed within the window 108. Other icons are shown, such as icon 120 entitled "Jeff's HD", which represents a hard disk, and icon 122, which represents a floppy disk to which the CPU 52 has access, and trash can icon 126.

In the presently preferred embodiment, the help system of the present invention is initiated by the user selecting the subcommand item identified as "Help" in the pull down menu 104. To select "Help", the cursor 44 is placed over Balloon help menu icon 112, and switch 46 is depressed. CPU 52 generates and displays menu 104, and the user then places cursor 44 over the "Help" subcommand, and releases switch 46. Alternatively, the user may select the "Help" function by inputting a predetermined keyboard equivalent using keyboard 56.

Figure 3:
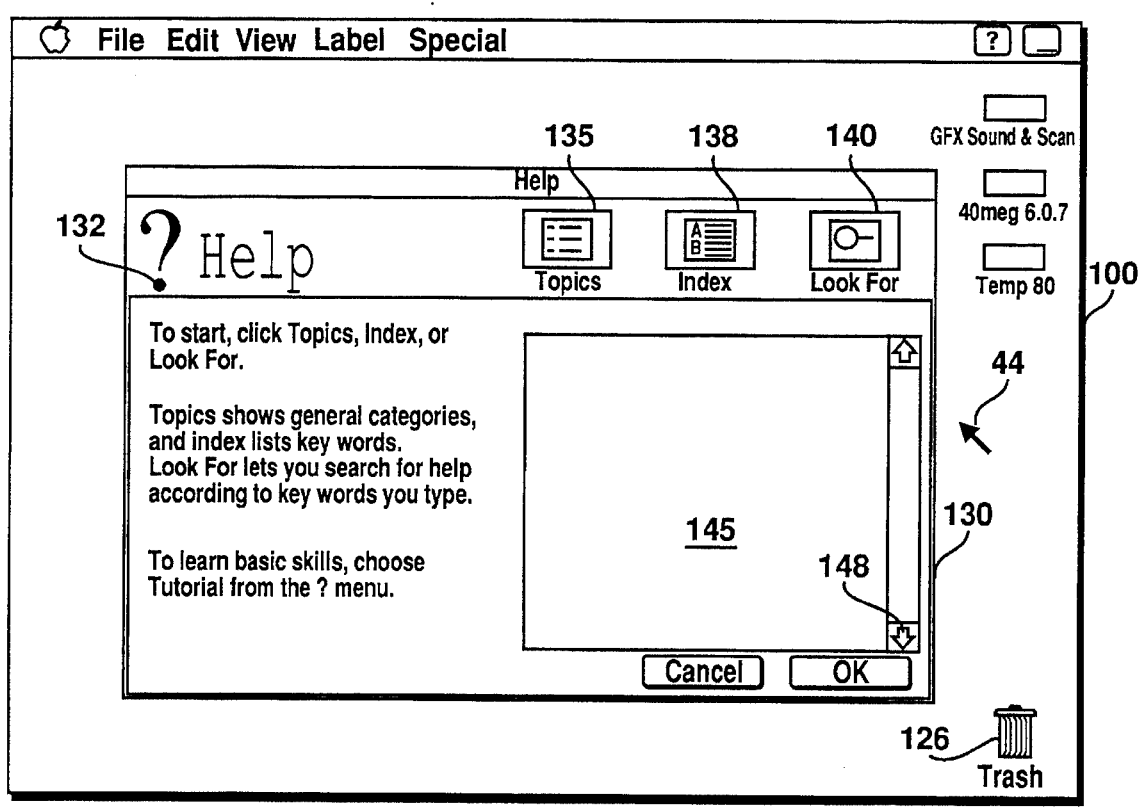
FIG. 3 is the access window of the present invention.

Upon selection of the "Help" function, the computer 48 generates and displays a help screen access window 130, illustrated in FIG. 3. The access window 130 includes a logo 132 and user instructions, as illustrated. In the presently preferred embodiment, the instructions shown within the access window 130, logo 132 and the window itself are part of a help data base stored in memory 55, or alternatively, on disk 60 or CD ROM 62. Access to the help data base is provided to the user through a topics button 135, an index button 138, and a lookup button 140, as will be described. In addition, as illustrated in FIG. 3, the access window 130 includes a working area 145 in which the CPU 52 displays instructions, text or command options. The working area 145 includes a vertical slider 148 for scrolling through data displayed within the working area 145. Additional features of the access window 130 will become apparent from the description below.

Figure 4:
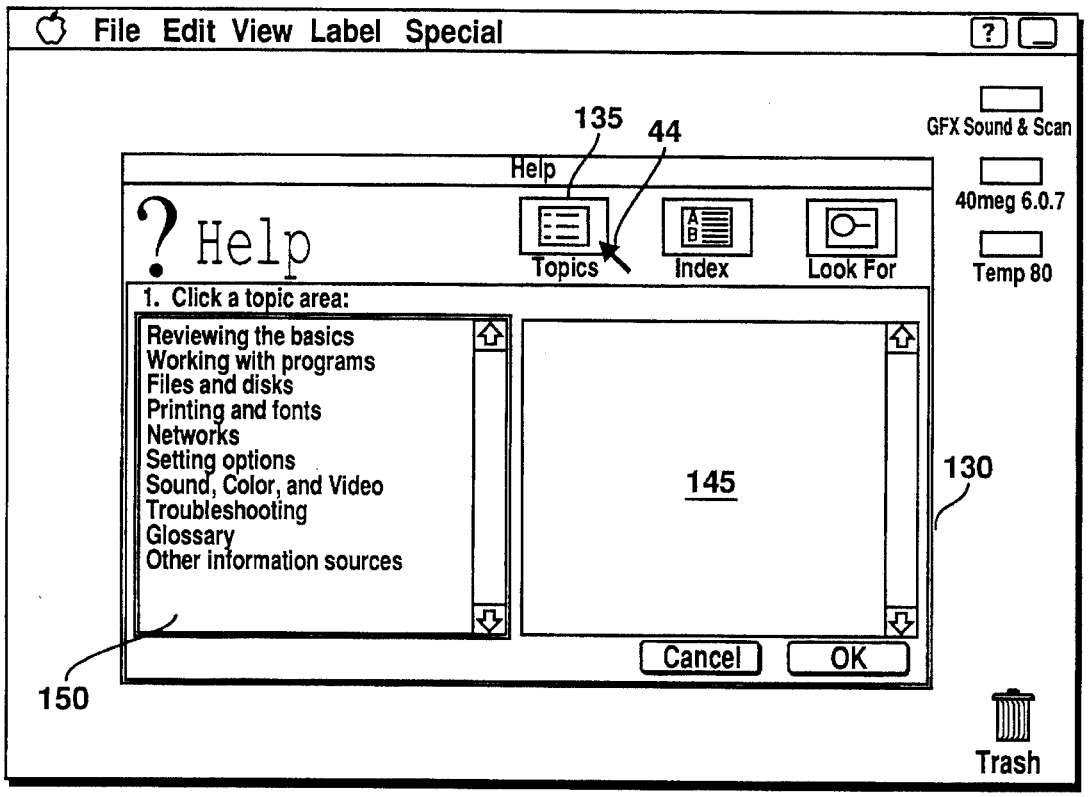
FIG. 4 illustrates the access window as shown in FIG. 3 once the topics screen has been selected.

Referring now to FIG. 4, the selection of the topics access method for the access window 130 is illustrated. As shown, to enter the present invention's help system through the "topics" button function, the user places the cursor 44 over the button marked topics (135) and momentarily activates ("clicks") the switch 46 on the mouse 42. In the present embodiment, while the cursor 44 is within the rectangle defining the button 135 and the button 46 of mouse 42 is depressed, the image of button 135 appears to be inverted as if it were being depressed. When the switch 46 on the mouse 42 is clicked over the topics button 135, CPU 52 generates and displays the access window 130 including a list of topics within a working area 150 as shown in FIG. 4.

Figure 5:
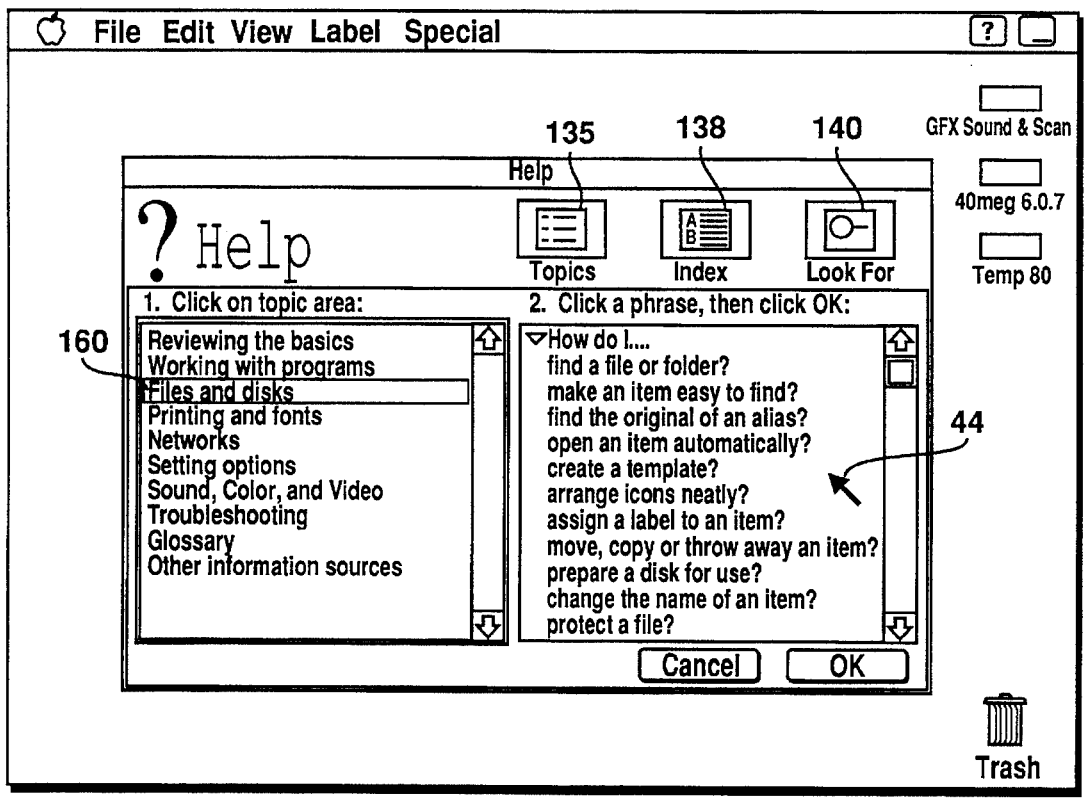
FIG. 5 illustrates the access window of FIG. 4 once the topic area for "files and disks" has been selected.

As illustrated, the user may then select one of a plurality of topics which the user desires help in. For example, in FIG. 5, if the user places the cursor 44 over the topic "Files and Disks" 160, and clicks button 46, the selection of the topic is sensed by the CPU 52, which then generates and displays a list of statements within the working area 145. In the present embodiment, the list displayed within the working area 145 comprises statements in groups which may include questions. The heading is a set of words that begins all statements or questions of a particular type (in the example of FIG. 5, "How do I"). The body is the remainder of the question or statement (for example in FIG. 5 "Change the name of an item"). In the presently preferred embodiment, the CPU 52 displays the headings in bold. The bodies of the questions or statements appear indented under the heading as shown in the figures. The invention's hierarchical design preserves the statement's format, while removing the redundant heading from each statement in the list. As a result, the list of statements has less text, and longer statements or questions fit more easily in the working area 145. In addition, users can easily scan the headings to see the types of statements or questions that are available, using the scroll bar 148.

Figure 6:
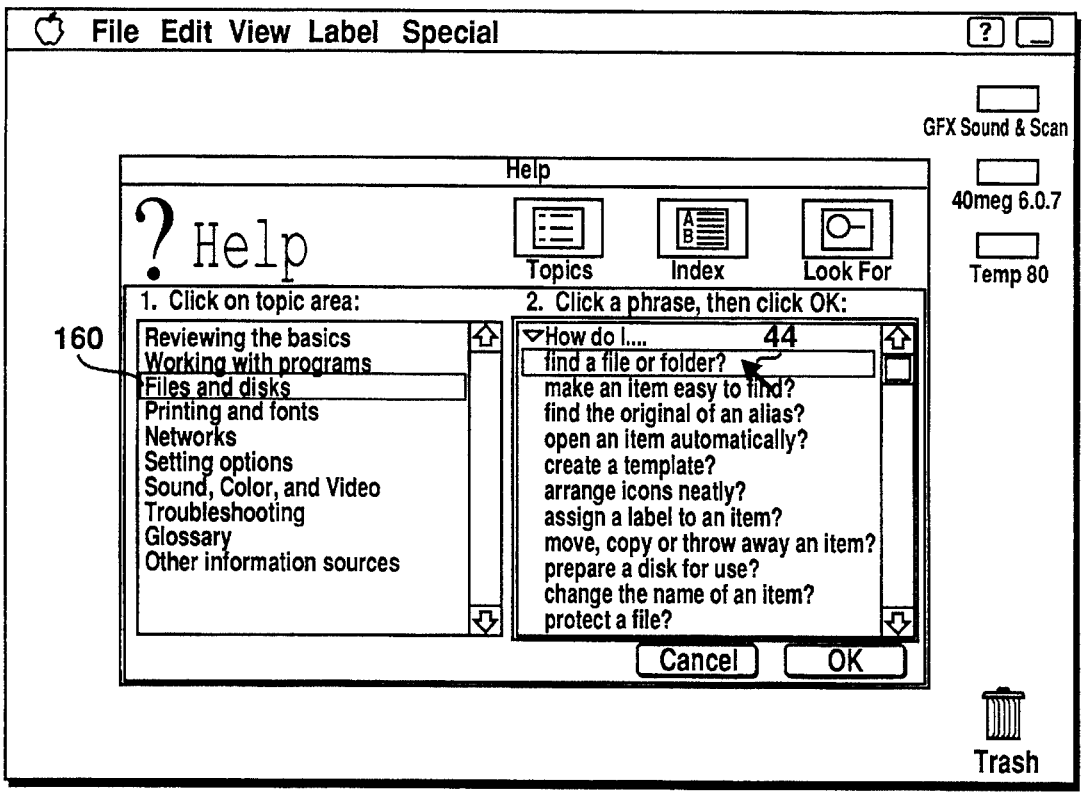
FIG. 6 illustrates the access window of FIG. 5 and shows the selection of "How do I find a file or folder?" being selected.

Referring now to FIG. 6, as illustrated, the topic area "files and disks" 160 provides the results in the illustrated questions shown. In the example of FIG. 6, the cursor 44 is placed through the appropriate movement of the mouse 42 by the user, over the question "Find a file or folder?", and the switch 46 is momentarily clicked. Selection of the question "How do I find a file or folder?", coupled with placing the cursor 44 over the "OK" button and clicking switch 46 again, results in CPU 52 generating and displaying a presentation window 165 illustrated in FIG. 7. Data and other information provided within the presentation window 165 requests additional information from the user (if required) and guides the user through the desired function. As will be described more fully below, both the access window 130 and the presentation window 165 "float" over other windows displayed on the display screen 68, without disturbing or altering the currently active window being displayed.

Figure 8:
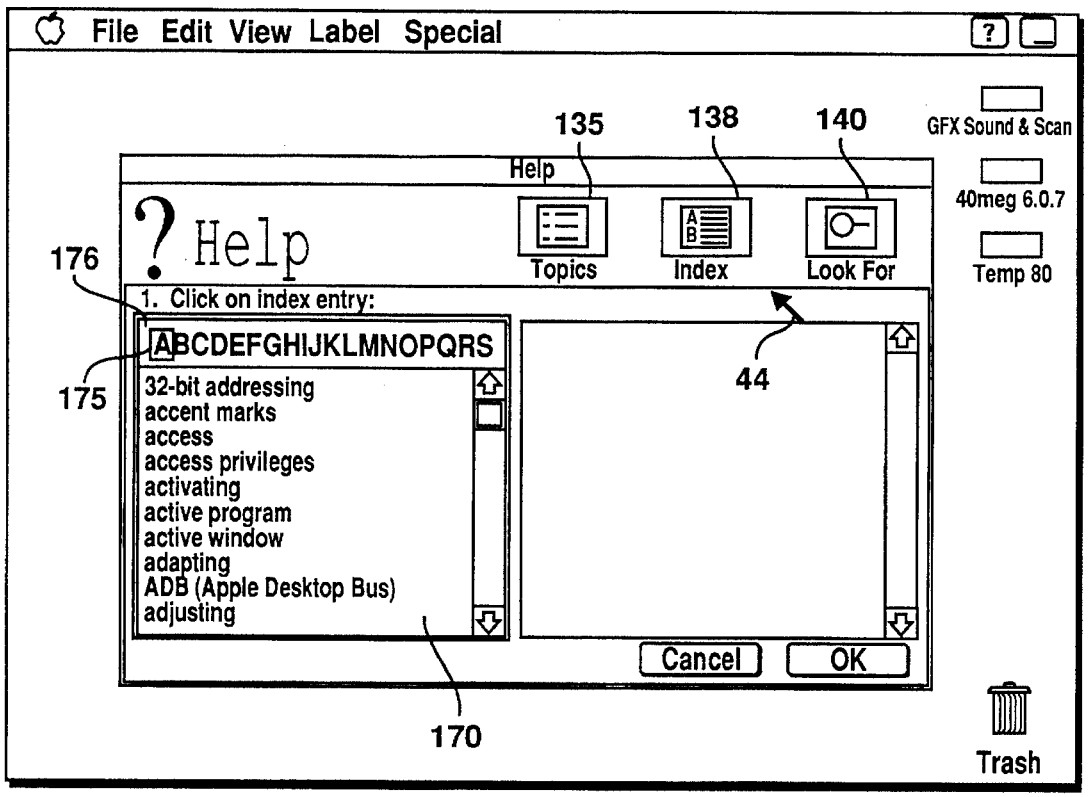
FIG. 8 illustrates the access window of the present invention showing the selection of the index screen and the present invention's alpha slider.

Referring now to FIG. 8, help information may also be obtained through the selection of the index button function 138. The placement of the cursor 44 over index button 138, and the momentary clicking of switch 46 on the mouse 42, signals the CPU of the selection of the index function 138. As illustrated in FIG. 8, upon the selection of index button 138, the index 170 is generated and displayed. The index allows users to find relevant questions based on specific terms and phrases (referred to collectively as "index entries"). The index screen 170 includes a plurality of entries, and the index button 138 remains inverted to indicate the function is active. The index screen 170 includes an alpha scroll bar 176. Since the index screen 170 contains many entries, the alpha scroll bar 176 allows users to scroll rapidly to a particular letter, similar to a rolodex on a desk. The operation of the alpha scroll bar 176 will be described in more detail below.

Figure 7:
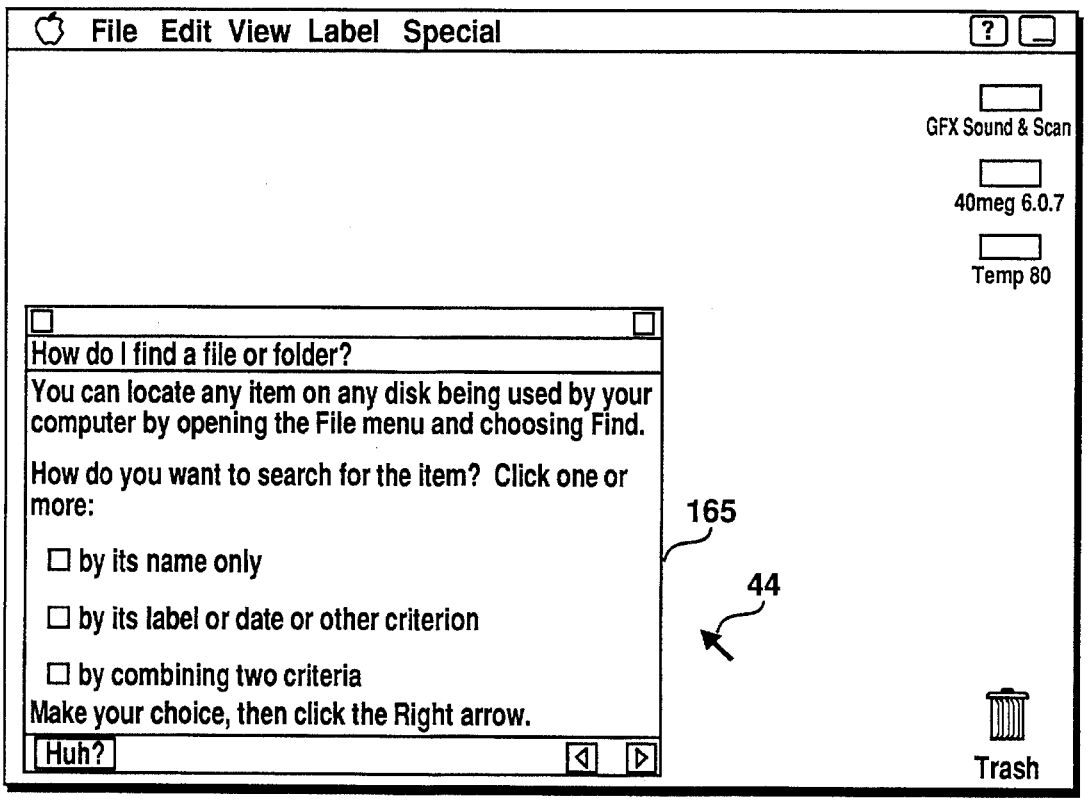
FIG. 7 illustrates a presentation window entitled "How do I find a file or folder?" displayed subsequent to the selection illustrated in FIG. 6.
Figure 9:
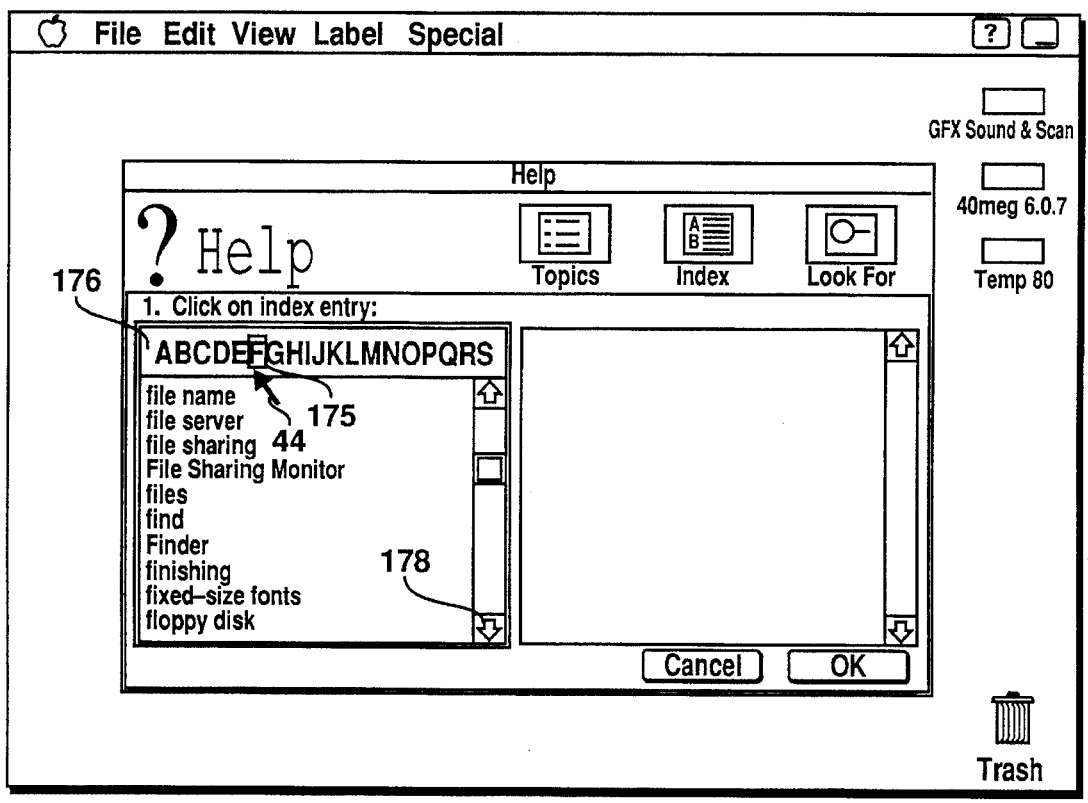
FIG. 9 illustrates the present invention's alpha slider placed on the letter "F" contents of the alpha index window within the access window.
Figure 10:
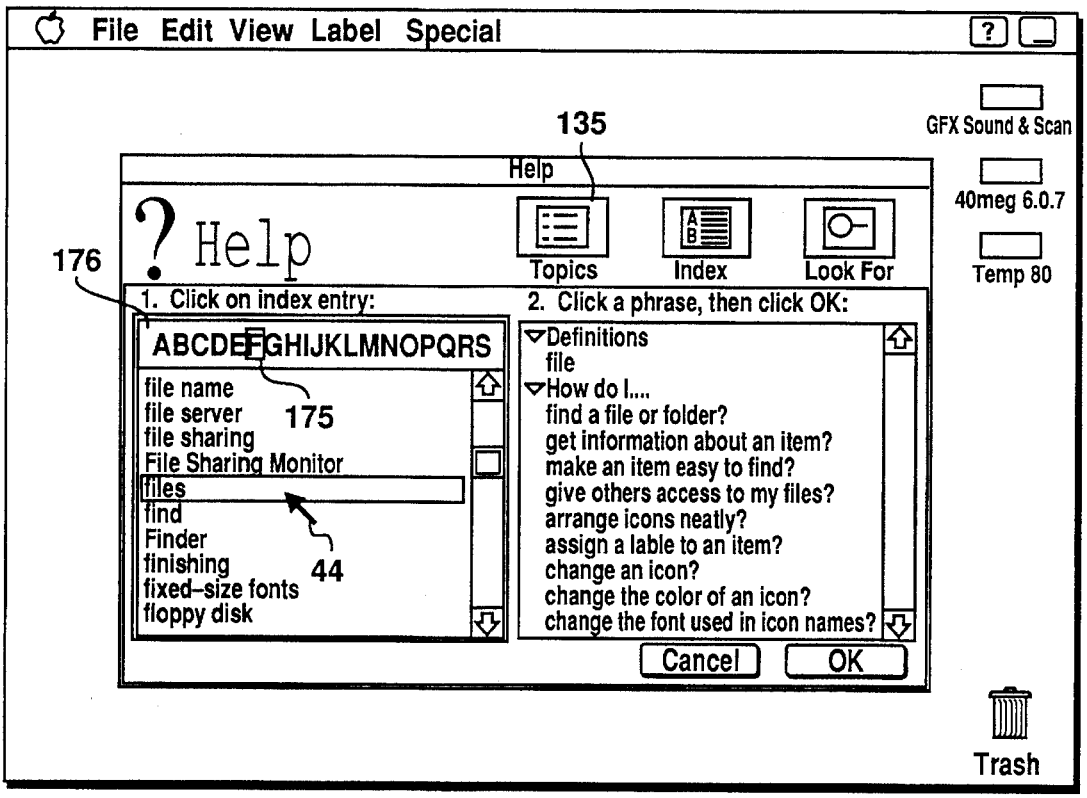
FIG. 10 illustrates the access window of FIG. 9 once the "files" entry has been selected in the alpha window.
Figure 11:
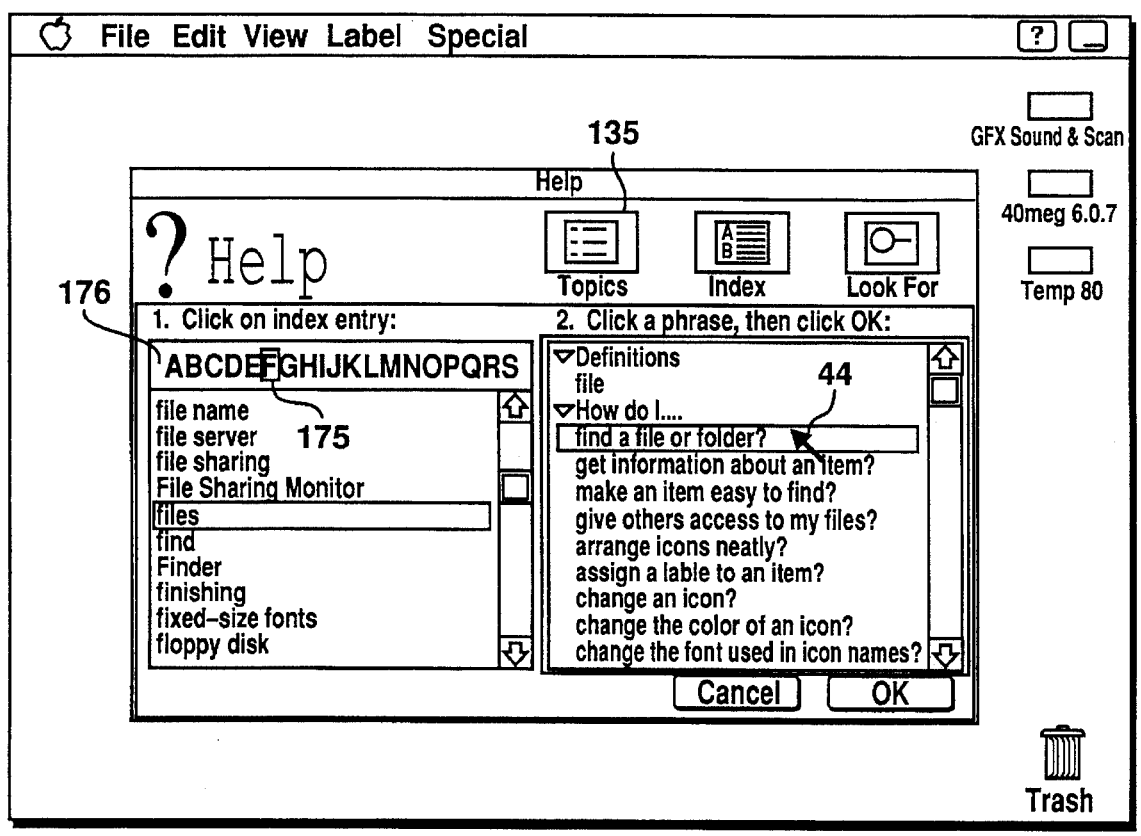
FIG. 11 illustrates the window of FIG. 10 once the selection "How do I find a file or folder?" has been selected.

The user places the cursor 44 over a portion of a desired letter (See FIG. 9) and momentarily clicks the switch 46 on the mouse 42. Upon sensing the letter selection, the CPU 52 displays the nearest and all subsequent entries beginning with the selected letter. In the example of FIG. 9, the user has selected the letter "F". Upon sensing the selection, the CPU 52 displays index entries beginning with the letter "F". In the event that there is insufficient display space to display all of the entries beginning with the letter "F", the user may use a scroll bar 178 to scroll the data disposed within the index screen vertically. Alternatively, a user may position the slider 175 over a desired letter by placing the cursor 44 over a portion of the slider 175, depressing the switch 46 on the mouse 42, and dragging the cursor and slider across the alpha scroll bar 176 to a desired letter. Upon reaching the desired letter (in FIG. 9 "F"), the user releases the switch 46 on the mouse 42. Once selected, the list of entries is displayed beginning with entries having the selected letter. As shown in FIG. 10, the placement of the cursor 44 over an entry such as "Files" and the momentary clicking of the switch 46 on the mouse 42, results in the display of a list of questions as previously described with reference to FIGS. 5 and 6. As in the example of the topics button previously discussed, as shown in FIG. 11, the user then selects a question (for example, "How do I find a file or folder?") and momentarily clicks the mouse button 46. As illustrated in FIG. 7, the presentation window 165 is then displayed and operates as previously described.

Figure 12:
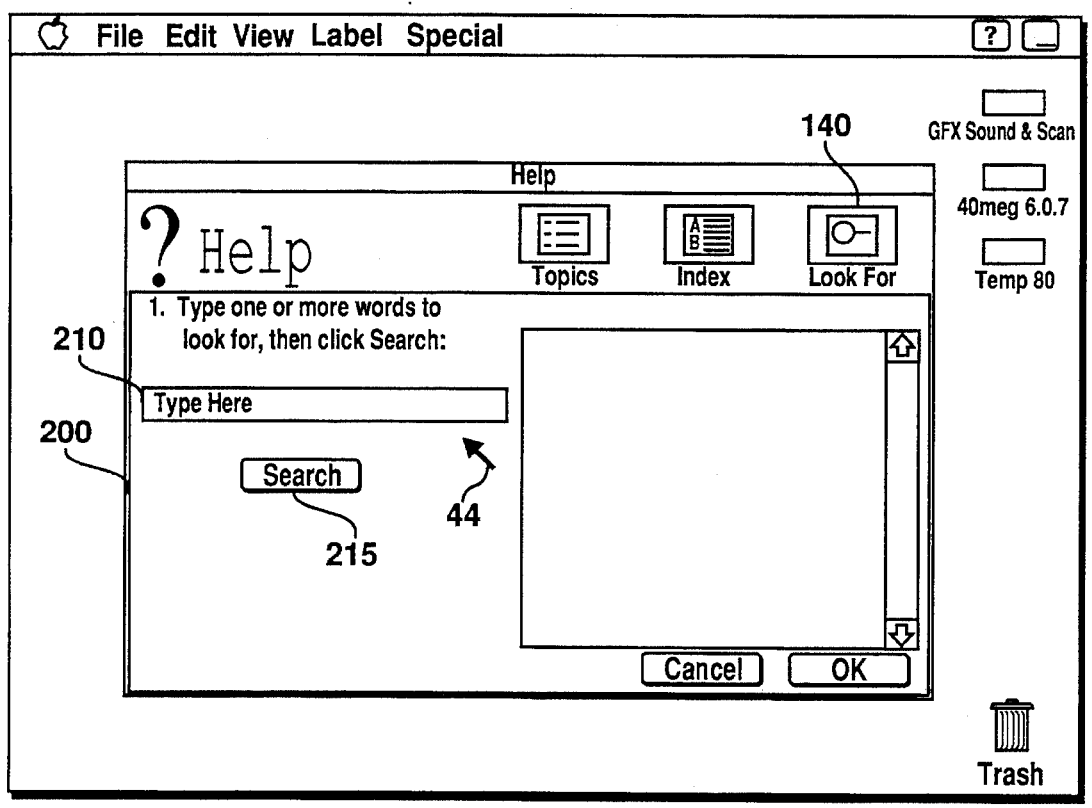
FIG. 12 illustrates the access window of the present invention having the "Look for" screen selected.

Referring now to FIG. 12, the placement of the cursor 44 over the "Look For" button function 140, and the momentary activation of the switch 46 on mouse 42, results in the generation and display of a look for screen identified generally by the numeral 200. The look for screen 200 permits users to type phrases in a text box 210 and view questions related to the phrase (if any). As in the previous examples with respect to the index and topics buttons, when the look for button 140 has been selected, the button appears inverted, thereby indicating it is currently active.

Figure 13:
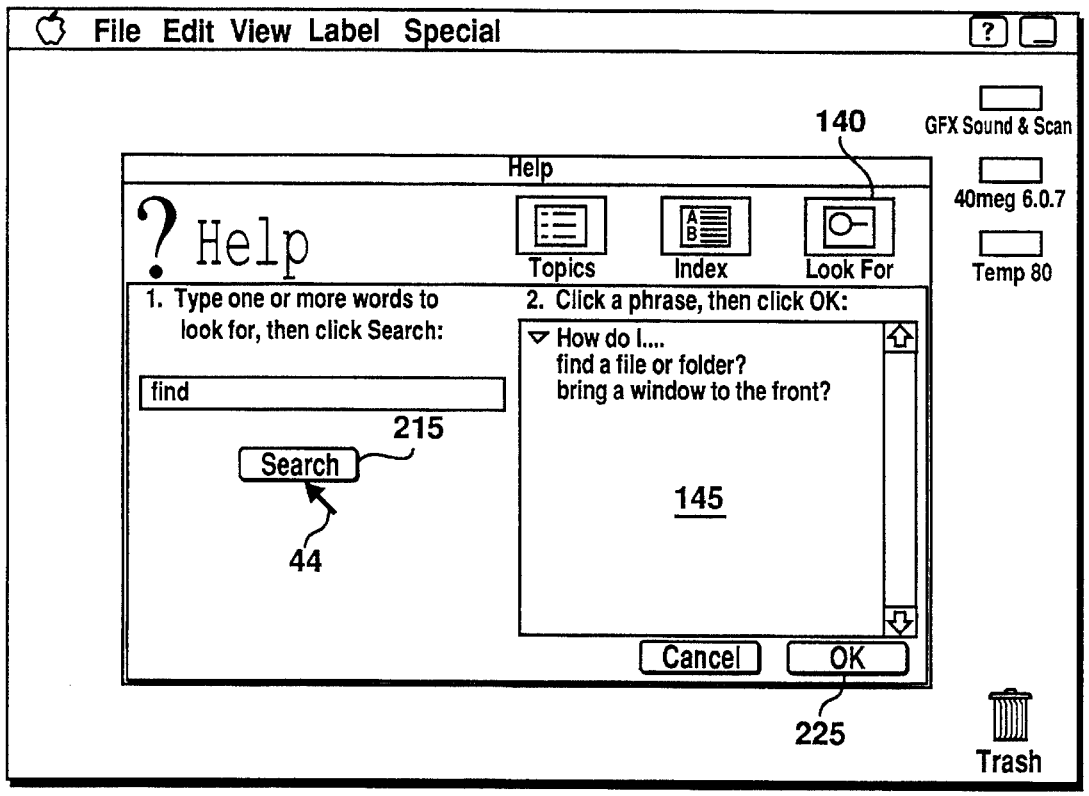
FIG. 13 illustrates the access screen of FIG. 12 after the word "Find" has been inputted and searched.
Figure 14:
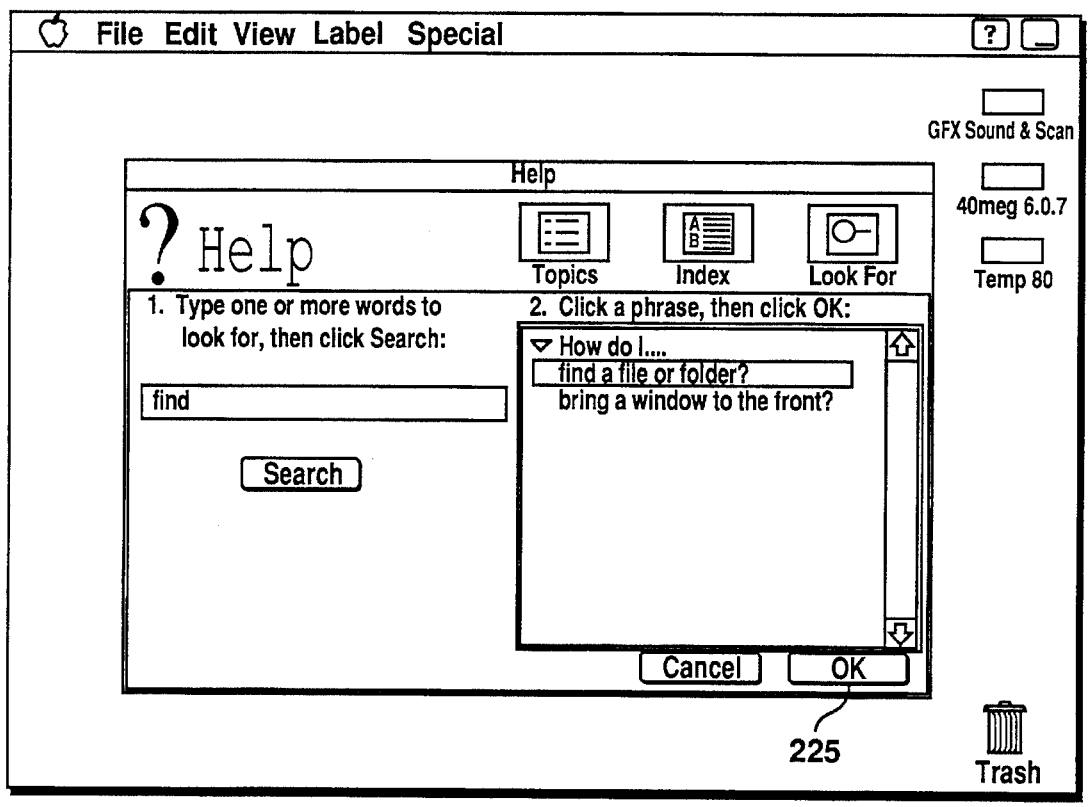
FIG. 14 illustrates the access screen of FIG. 13 in the selection of "How do I find a file or folder?" being selected.
Figure 15:
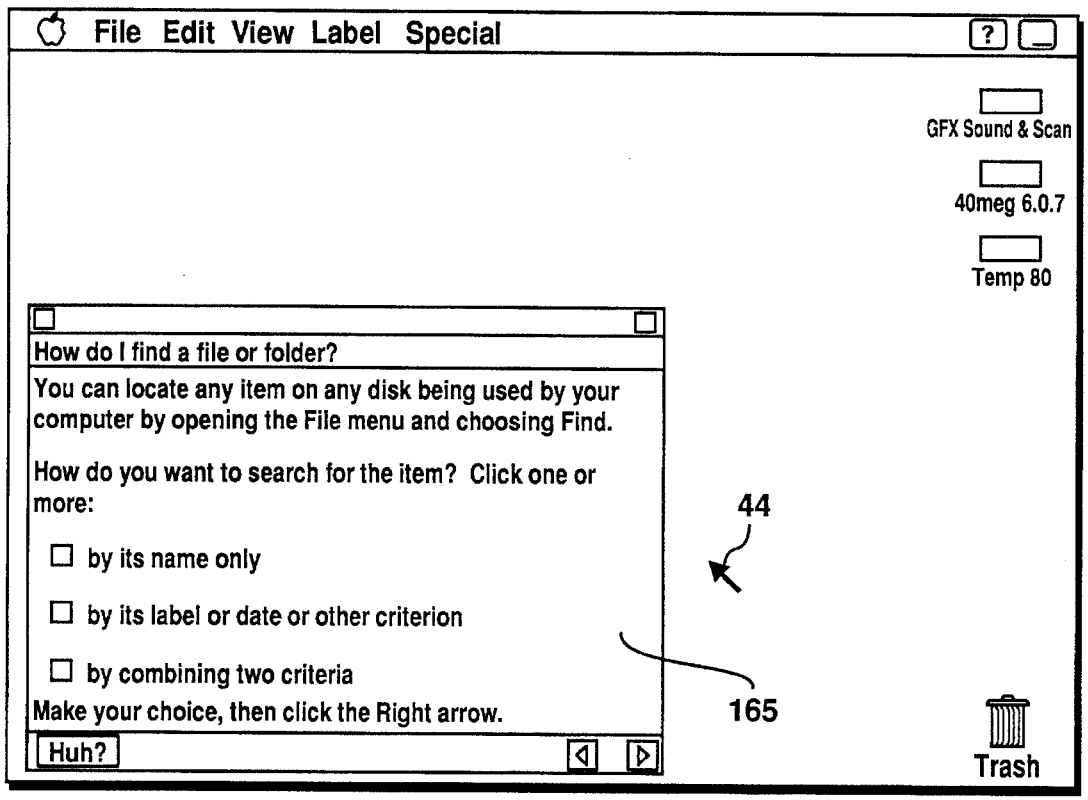
FIG. 15 illustrates a presentation window entitled "How do I find a file or folder?" displayed subsequent to the selection illustrated in FIG. 14.

As illustrated in FIG. 13, the look for screen 200 also includes a search button function 215. In operation, the user utilizing the keyboard 56, types into the text box 210 a search word (in the example of FIG. 13, the word "find"). The user then places the cursor over the search button function 215 and momentarily clicks switch 46. Upon the selection of the search button 215, the CPU 52 searches the help data base stored in memory 55, mass memory 60 or CD ROM 62 and displays the list of questions corresponding to the search term within the working area 145, as previously described with reference to FIGS. 3 through 11. As illustrated in FIG. 14, to select a desired question (such as "How do I find a file or folder?"), the user places cursor 44 over the question and momentarily clicks switch 46. To initiate the selected help function, the user then places the cursor 44 over the "OK" button function 225 and once again clicks switch 46. Upon sensing the selection of the help inquiry, the CPU 52 then generates and displays the presentation window 165, as previously described with reference to FIGS. 7 and 11. The user then may further define the help request by selecting one of the three (as shown in the example of FIG. 15) criteria displayed in the presentation window 165.

Accordingly, as described in this Specification, the present invention provides three access methods for obtaining desired help information from the computer system 48. A user may select the topics button function 135, the index button function 138, or the look for button function 140. Using one of the three select button functions, an appropriate access window and presentation window is displayed to assist the user in obtaining the desired information necessary to operate the computer system illustrated in FIG. 1.

Coach marks

Understanding names and identifying objects may be particularly confusing to end users in operating a computer system. Thus, as will be described, the present invention provides an additional feature which further assists users in operating the computer system illustrated in FIG. 1. A technique is disclosed for spotlighting objects on the display 68 which are referred to in the help presentation windows. The present invention provides visual cues, referred to as "Coach marks", which appear to be hand drawn, but are generated by the CPU 52, to coach the user through the requested help function. As will be appreciated, the coach marks draw the user's attention to objects displayed on display 68, and are effective in identifying objects even if the user has no prior knowledge of the object's name or function. The coach marks are visual, and as such, operate independent of the language of the user. Although the present invention is illustrated in FIGS. 16 through 22 as utilizing coach marks which are black and white, it will be appreciated by one skilled in the art that the coach marks may be rendered in a translucent color as well using a color display system.

Figure 16:
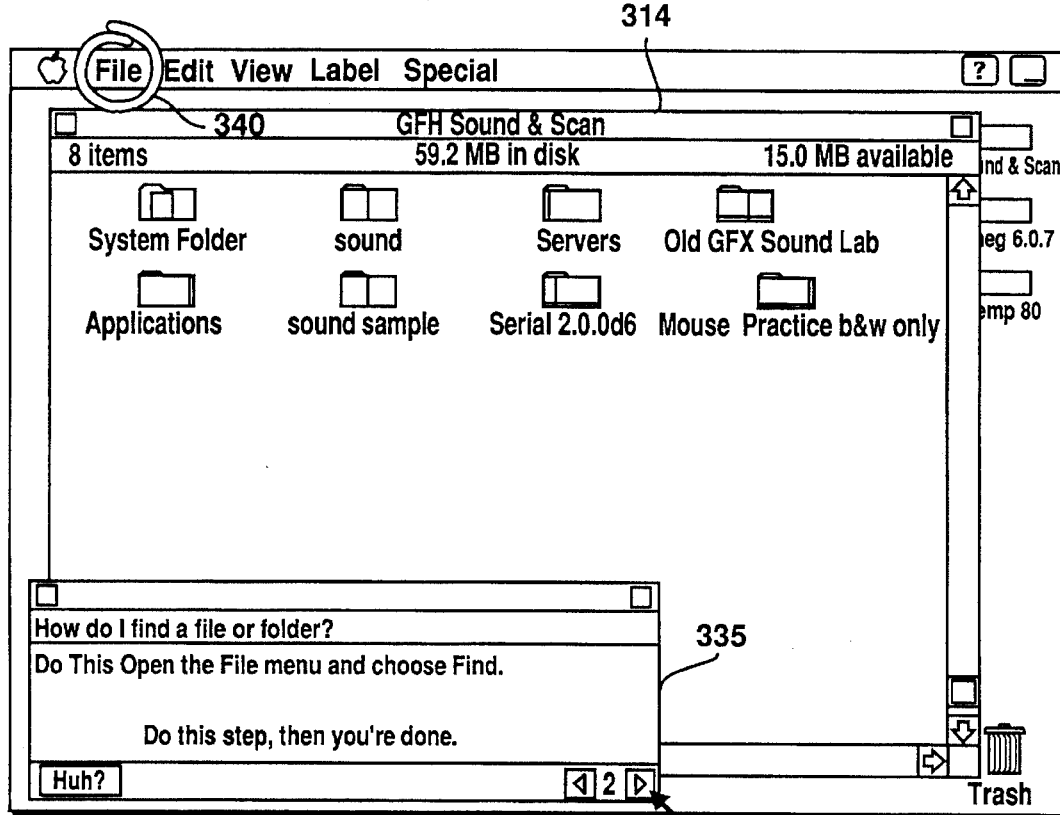
FIG. 16 illustrates the presentation window of the present invention in conjunction with a coach mark encircling the menu choice "File". Note that in an actual implementation, the Coach mark would not exit from the top of the menu since it would then be completely off the display screen.

Referring now to FIG. 16, there is shown the GFX Sound and Scan window 314. In addition, a presentation window 335 is illustrated overlaying the GFX Sound and Scan window 314. Also shown is a coach edit mark 340 which encircles the command option "file" on a menu bar 345. In operation, substantially simultaneously with the generation and display of the presentation window 335, the CPU 52 generates and displays the coach mark 340. In the presently preferred embodiment, the generation and display of the coach mark 340 appears to the user to be hand drawn with a hand marker, or the like. In addition, in the presently preferred embodiment, the coach mark 340 is rendered in a color which may be selected by the author of the data base, and the coach mark 340 is displayed by the CPU at a speed such that the rendering is intentionally slower than other CPU operations on the display and appears to the user as if animated. The purpose of the coach mark 340 is to identify and draw the user's attention to objects on display 68 which the user must choose or otherwise operate upon, to accomplish the desired help function accessed through the access window and presentation windows of the present invention described above.

Figure 17:
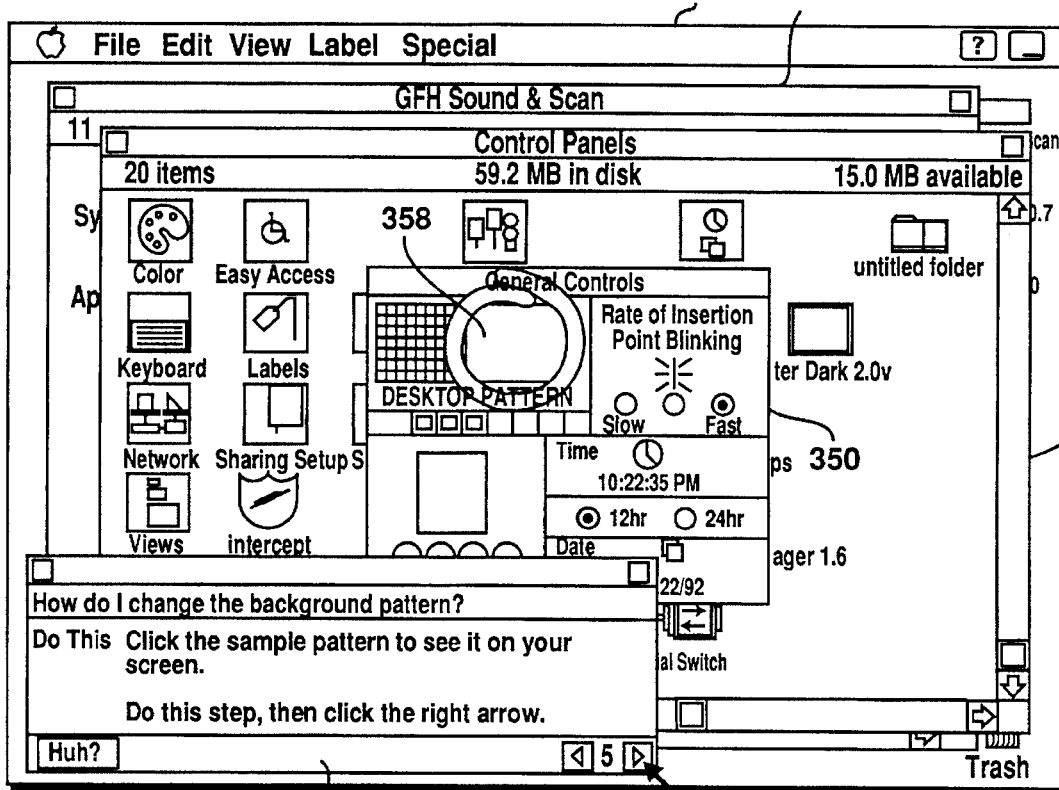
FIG. 17 illustrates the presentation window of the present invention disposed over an active window entitled "General Controls" in which a coach mark visual cue encircles a desktop pattern.

Referring now to FIG. 17, there is shown another example of the present invention's use of coach marks to assist the user. In the example, through the appropriate selection of a question in the access window (not shown), a presentation window 348 is displayed. An active window identified as general controls 350 is displayed overlaying the control panels window 352 and the GFX Sound and Scan window 314. To assist the user in accomplishing the desired help function which, in the present example, is phrased as "How do I Change the Background Pattern?", a circular coach mark 355 is provided by CPU 52. In the example illustrated in FIG. 17, the CPU 52, upon the generation and display of presentation window 348, also generates coach mark 355, and encircles the icon comprising a desktop pattern 358, as shown. The generation and display of the coach mark 355 draws the user's attention to the appropriate icon on the display 68 which the user must operate upon. It has been found that by providing coach marks which appear to be "hand drawn" by a human, the user is better able to visually identify the location of the display 68 on which he must act. Therefore, CPU 52, in the presently preferred embodiment, generates the coach marks of the present invention in a fashion which appears to the user as if a human was drawing on display 68 with a colored marker. As can be seen in FIG. 17, the coach mark 355 approximates a circle, and has the visual appearance as if a human drew the mark around the icon 358. The rendering of the coach mark 355 such that it only approximates a circle, as opposed to being a mathematically precise rendition of a circle, has been found to best catch the user's attention since the coach mark 355 does not appear completely symmetrical as if drawn by a machine. In addition, the coach mark 355 is rendered on the actual interface as it is displayed by CPU 52, and not simply a representation of the interface stored in memory.

Figure 18:
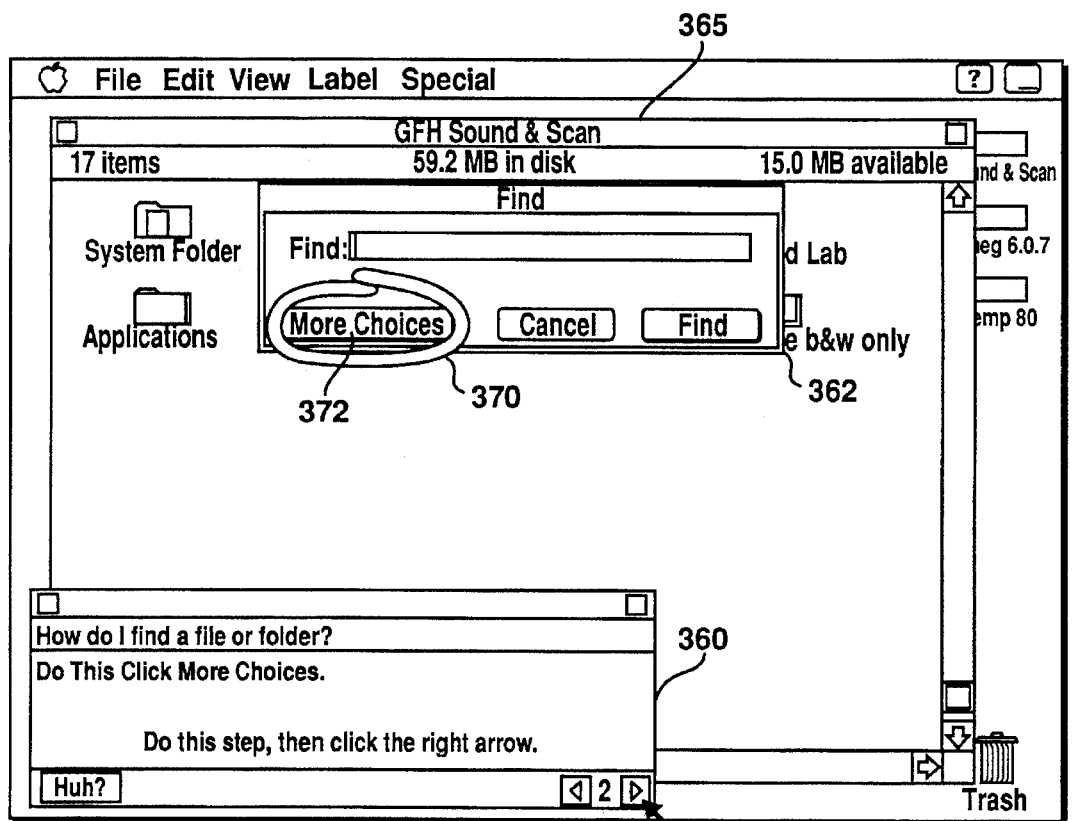
FIG. 18 illustrates the presentation window of the present invention and a coach mark visual cue encircling "More Choices" in a window entitled "Find ".

Referring now to FIG. 18, another example of a circular coach mark is illustrated. As shown, a presentation window 360 is displayed on the display 68. A "Find " window 362 overlays a GFX Sound and Scan window 365. In the example, the presentation window 360 and the find window 362 are simultaneously active. The GFX Sound and Scan window 365 is currently inactive since it underlies the Find window 362. As in the example of FIGS. 16 and 17 upon generating the presentation window 360, the CPU 52 further generates a circular coach mark 370 which encircles a button function entitled "More Choices" 372, and displays the coach mark in a translucent color in the case of color monitors, or alternatively, in black and white.

Figure 19:
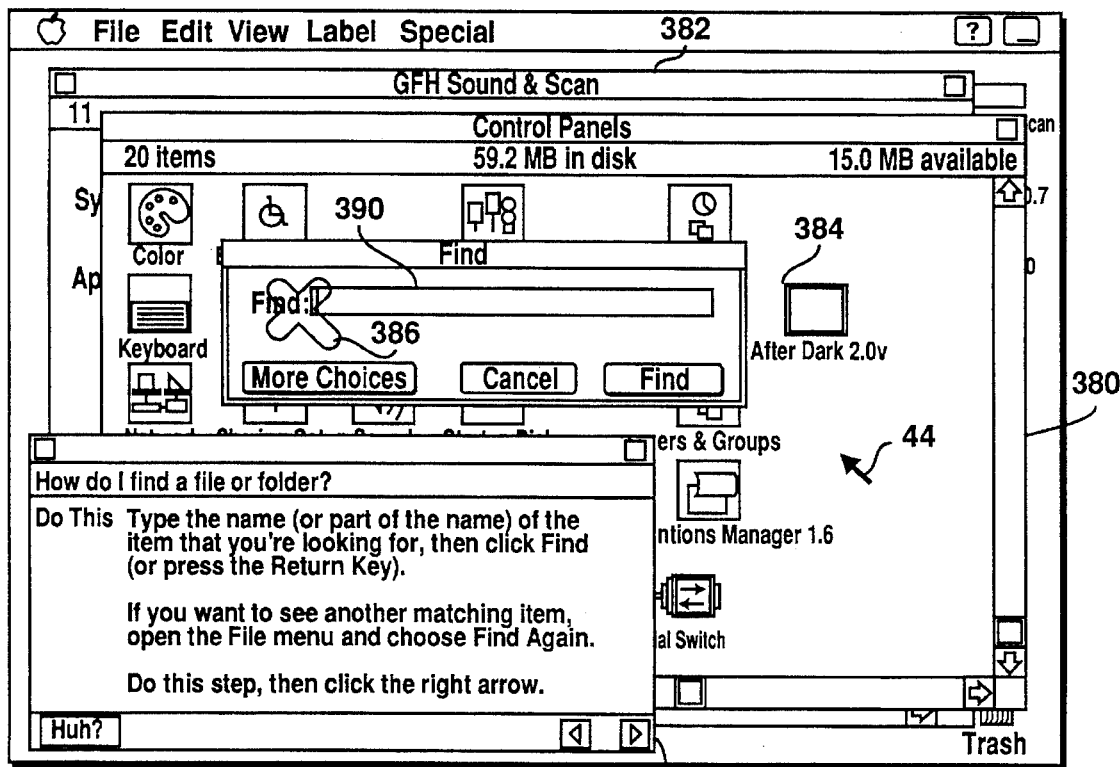
FIG. 19 illustrates the present invention's use of coach marks to identify an area which requires a user to insert data or make a selection.

Referring now to FIG. 19, therein is illustrated a presentation window 378 which overlays a control panels window 380 and a GFX Sound and Scan window 382. Also illustrated is a Find window 384 which overlays the control panels window 380, and is active. As such, the Find window 384 and the presentation window 378 are the currently active windows in the example. Also shown is a coach mark having the general shape of a "X" 386 which draws the user's attention to an area in the Find window 384 which requires the user to input data. The user must insert a search term in a "find" field 390 to obtain the necessary help information identified by the question "How Do I Find a File or Folder?" displayed in the presentation window 378. Thus, in the present example, the coach mark 386 takes the form of what appears to be a hand written "X" which is generated and displayed by the CPU 52, to assist the user in identifying the location at which the user must input data.

Figure 20:
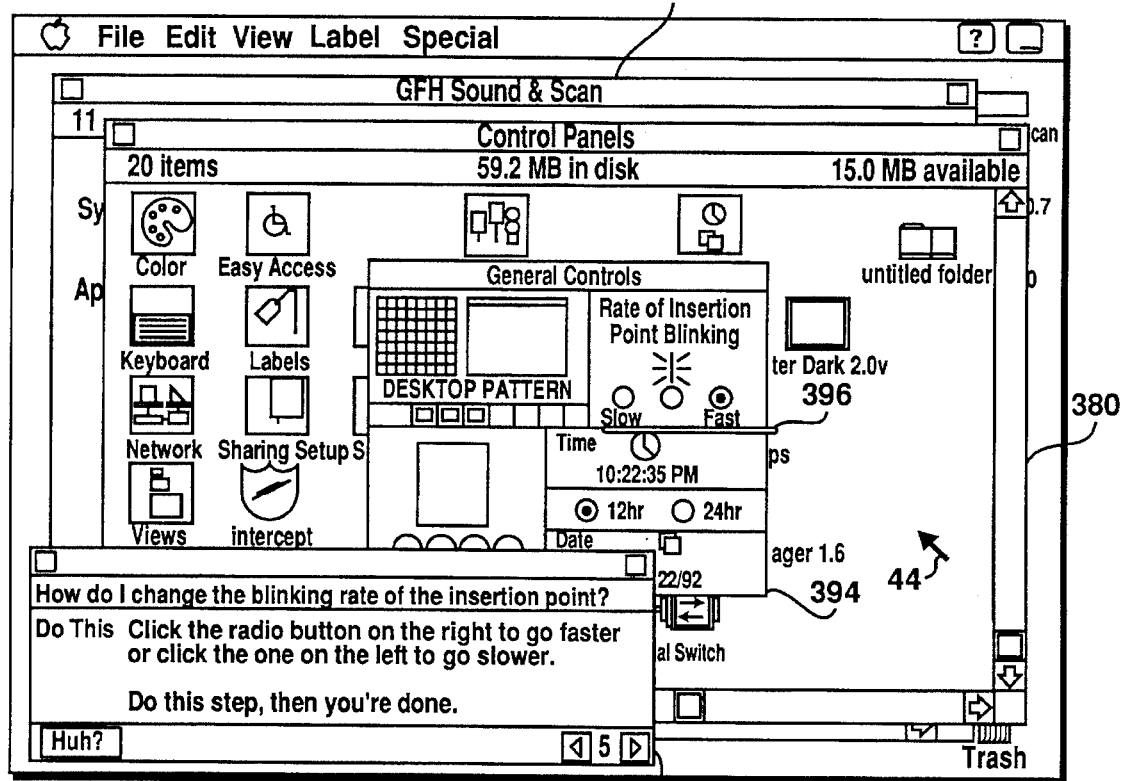
FIG. 20 illustrates the presentation window of the present invention in which a coach mark has been inserted underlining a portion of the "General Controls" window.

Referring now to FIG. 20, the present invention's use of coach marks is illustrated in which a presentation window 392 is displayed and overlies a portion of an active window entitled general controls 394. The control panels window 380 and the GFX Sound and Scan window 382 are displayed, but are not active windows. As illustrated, using the teachings of the present invention described above, the user has identified the questions "How Do I Change The Blinking Rate of the Insertion Point?", and in response, the CPU 52 has generated the presentation window 392 with instructions on how to accomplish the desired task. In addition, the CPU 52 further has generated and displayed an underline coach mark 396 to draw the user's attention to the button functions which must be operated upon to accomplish the desired task of changing the blinking rate of the insertion point.

Figure 21:
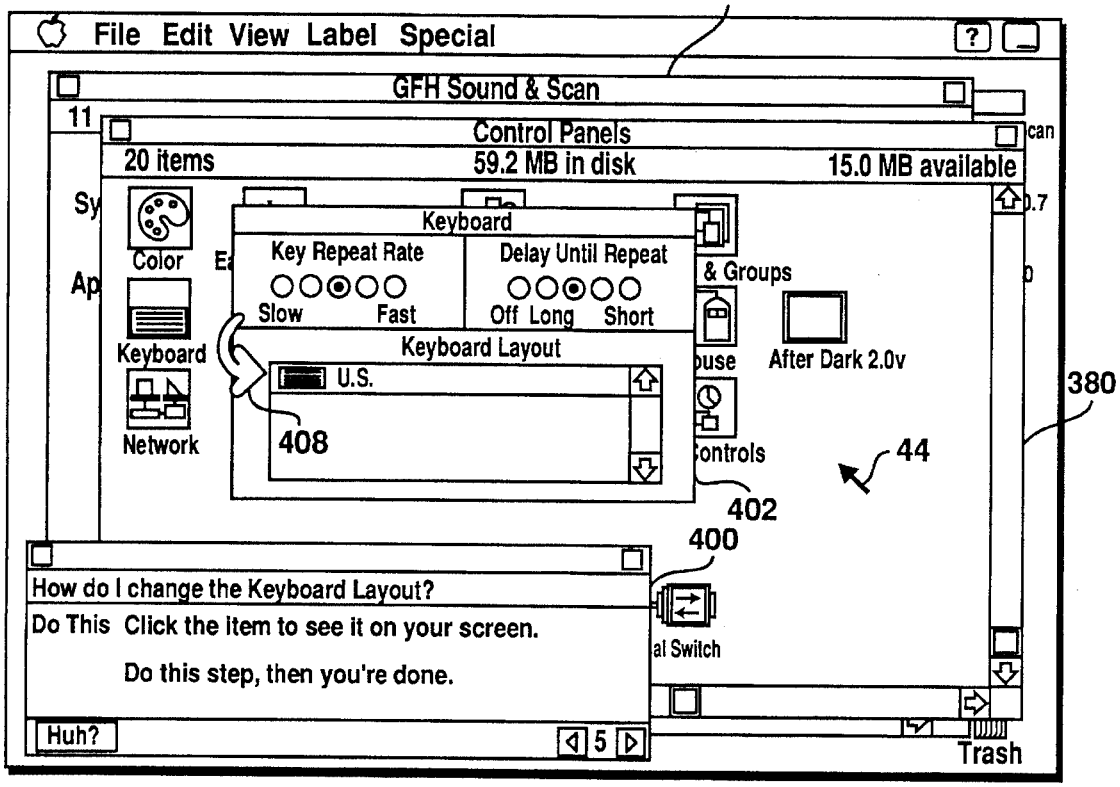
FIG. 21 is an additional illustration of the presentation window of the present invention in which a curved arrow coach mark is used to identify a portion of a window entitled "Keyboard".

With reference to FIG. 21, in response to an inquiry by the user of "How Do I Change the Keyboard Layout?", the CPU 52 then writes and displays a presentation window 400 which overlays the control panels window 380 and a portion of the GFX Sound and Scan window 382, as shown. A window entitled "Keyboard" 402 has been opened and displayed. As illustrated, to assist the user, the CPU 52 generates and displays a coach mark in the shape of an arrow 408. The arrow coach mark 408 draws the user's attention to the necessary item which must be selected to accomplish the desired task of changing the keyboard layout.

Figure 22:
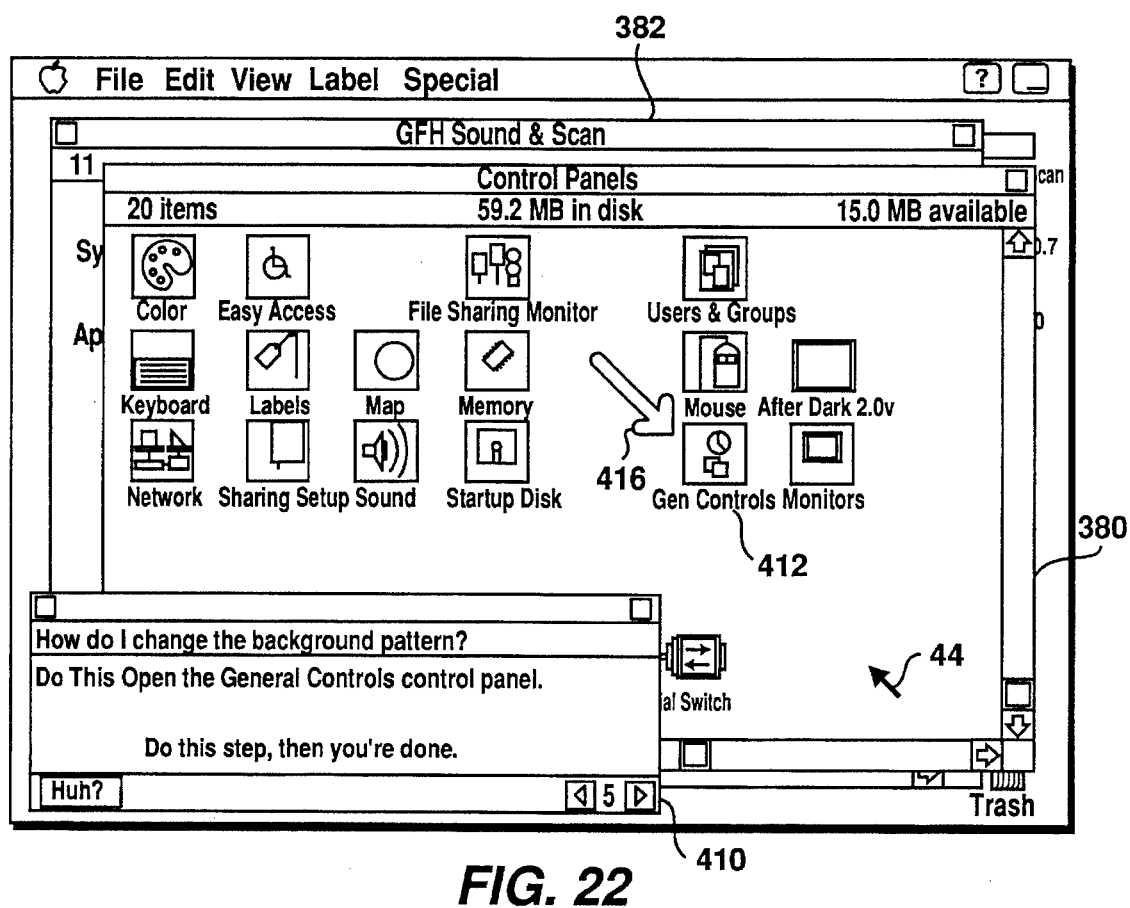
FIG. 22 is an additional illustration of the coach mark of the present invention in which a straight arrow coach mark is used to identify a selection which is required by the user to accomplish a desired function identified in the presentation window.

Similarly, in FIG. 22, through the use of the access window of the present invention (not shown), the user has selected the question "How Do I Change the Background Pattern?". In response to this inquiry, the CPU 52 generates and displays a presentation window 410 which overlays the control panels window 380 and the GFX Sound and Scan window 382. As illustrated, the presentation window 410 notifies the user that to change the background pattern, the icon entitled "General Control" 412 must be "opened". To draw the attention of the user to the general controls icon 412, the CPU 52 generates and displays a straight arrow coach mark 416 as shown.

The use of coach marks to draw the user's attention to specific objects, functions or other display elements on screen 68, has been found to greatly assist the user in operating the computer system illustrated in FIG. 1. It will be appreciated by one skilled in the art, that although the present invention's use of coach marks has been described with reference to the help system disclosed herein, that use of coach marks is not limited to the help system as provided in this Specification. It is anticipated that the coach marks as disclosed and described in this Specification have application to a variety of graphic user interface functions, and are not limited to use in a graphic help system.

Referring now to FIGS. 23 through 41, the present invention's methods and apparatus for generating and displaying coach marks will be described in more detail. Although the below discussion specifically describes coach mark generation using an Apple® graphic user interface, hardware, programming language, and supporting systems, it will be understood that the present invention may be applied to a variety of computer systems, including systems such as those manufactured and sold by IBM®. In addition, for purposes of this Specification, the entire help system as herein before described is known as the "Reno" system, and the visual cues and supporting computer programming is referred to as "Coach marks", and "Coach " or "Coach code", respectively. "Events" are referred to as "Apple events" to identify that they are Apple specific to the operating systems offered by Apple Computer, Inc. in this description. Throughout this specification, it will be noted that Apple® is a registered trademark of Apple Computer, Inc., of Cupertino, Calif.

Figure 23:
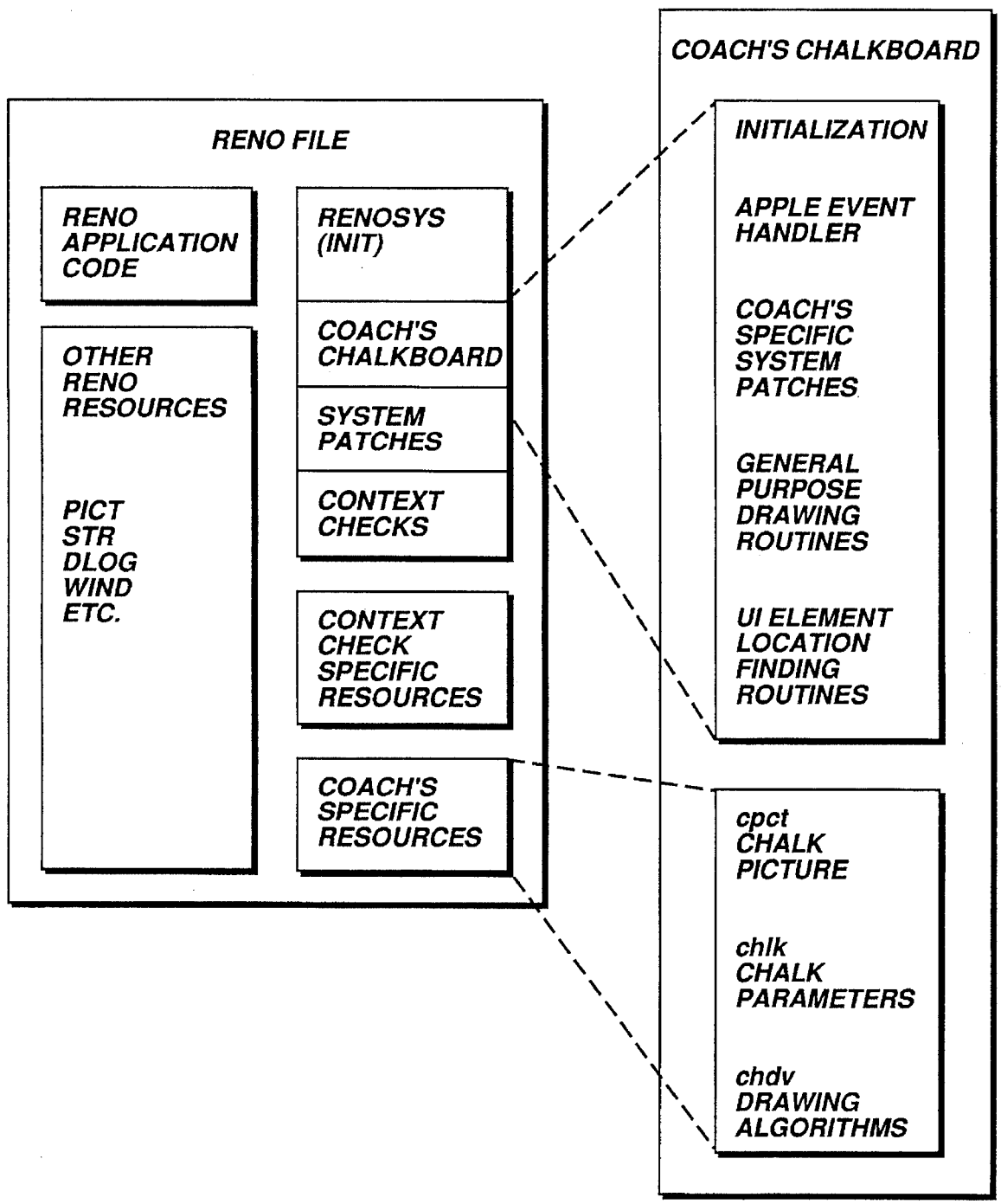
FIG. 23 conceptually illustrates the components of "The Coach's Chalkboard" code and how they are included in the Reno help system.

Referring now to FIG. 23, there is shown a conceptual diagram of the "coach's chalkboard" comprising the Coach computer code as it relates to the Reno help system modules. As shown, the coach code resides in modules known as "Coach's Chalkboard" and "Coach's Specific Resources". The Coach's Chalkboard includes routines such as initialization (See FIGS. 24 and 25), specific system patches, general purpose drawing routines and user interface element location finding routines.

For purposes of this Specification, the following terms are used with the described characteristics:

Screen Objects

The coach code can mark interface objects with graphics that appear to be "hand-drawn" on the display 40. The types of objects that are identifiable are generally the same objects on which the help manager is capable of displaying a Balloon in the operating system known as "Apple System 7". The coach code is similar to the Apple Balloon help of System 7 discussed in the background of the invention, in that it classifies the graphical objects on the screen in two ways, as either dynamic or static objects.

Static Object

A static object is an object that resides in a particular window and maintains a constant position within that window. A good example of a static object would be the Control Panel's desktop pattern selector, shown circled in FIG. 17. As described below, static objects are easily supported by the coach code with the addition of simple resources.

Dynamic Object

A dynamic object is an object that resides in a window, but can be created, moved, or deleted by the user. Files and folders within the Finder's windows are good examples of dynamic objects. In order for an application to allow Coach to support it's dynamic objects, an application programmer will have to add code to his application that identifies the current location of the dynamic object.

The main body of the Coach computer code resides in a system extension that is initialized on booting the program comprising the present invention (INIT) resource. The INIT code segment patches the OS routine "GetNextEvent" after some preliminary initialization. The GNE patch acts as Coach's Main Event loop, from which point, Coach receives and sends Apple events and initiates drawing sequences. Additionally, Coach uses this patch to provide periodic time for animation and time out (erase) routines.

When Coach is attached to the GNE loop, it assumes the identify of the currently running application, and as such, it filters the event records before they are passed to the main application. Its primary function is to look for Coach-specific Apple events that are being sent to an application. When Coach receives such an Apple Event, it "removes it from the Event Queue" and processes the Apple Event directly. Usually the Apple Event will tell Coach to do something specific like "Circle the grow box". (See FIG. 25) Because Coach relies heavily on Apple events, the application supporting Coach is compatible with the operating system, and support high-level events.

Coach Apple events consist of a command identifier and data. For example, the command could be 'draw', and the data could be the name of the user interface object that needs attention (i.e. "Shape"). When Coach receives a command like the one described above, it then proceeds to use resources to look up the location of the requested object to get its location on the screen, then, identify the object in some predetermined way. If no resource is found that matches the requested object name, the application is then sent a request asking for the location of the object in question. Both the resource format of the naming resource, and the process with which messages are sent to applications are detailed below.

There are three different resources that assist the coach code to do its work. They are introduced in the following chart, then described in detail below:

| Resource | Purpose |
| --- | --- |
| 'hBnd' | Associates a name with an interface object. |
| 'chlk' | Describes chalk characteristics. |
| 'chdv' | Code resource that draws the Coach mark. | hBnd resource

Coach is designed to allow the application programmer to leverage on the work already done to support the Balloon Help resources of System 7 to identify objects. However, to simplify the application's messages to Coach, a new resource has also been defined, the 'hBnd' (or help bundle) resource.

Help bundle resources are used to give a definitive name to each important user interface feature (or object) within the application. That is to say, the 'hBnd' resource "Bundles" a name with an object.

An application programmer adds one 'hBnd' resource for each item in the application that has a Balloon resource to describe it (either 'hrct' or 'hdlg').

hBnd example

Let us assume, for example, we are making 'hBnd' resources for the following hdlg resource fragment:

```
resource 'hdlg' (256, "Simple Dialog") {
    HelpMgrVersion,
    0,
    hmDefaultOptions,
    0,
    0,
    {
        /* Missing dialog items info*/
        /* item 1:Cancel info*/
        /* item 2:OK info*/
    }};
```

The following chart illustrates the information that is required in the 'hBnd' resources for the 'hdlg' resource:

| Data | Purpose |
| --- | --- |
| 1 | Current Balloon help version number |
| 'hdlg' | Type of resource to be bundled |
| 256 | Resource ID of bundled resource |
| "OK" | Coach's name for first dialog item |
| "Cancel" | Coach's name for second dialog item |

Since there are two help items being described here ("OK ", and "Cancel"), there are two separate 'hBnd' resources. Each 'hBnd' resource describes a single Balloon item in the application.

First, each 'hBnd' resource contains a Balloon help version number with which it is compatible. This number must match the version number included in the Balloon resources. In our example, we are assuming the number is 1.

Next, each 'hBnd' resources indicates the resource that it is bundling with, in this case, type 'hdlg' with ID of 256.

Finally, the 'hBnd' resources must declare the Coach name for each item listed in the Balloon resource (we call these items objects). In this case, there are three objects listed in the 'hdlg' resource. They correspond to "Missing Items", "Cancel item", and "OK item". This is where the actual name that is used to identify these objects is provided and known as the "bundle name". This name is not actually resident in the 'hBnd' data structure, but rather, is the name of the 'hBnd' resource itself. This name can be any string, up to 32 characters, that can uniquely identify the specified object. Each 'hBnd' resource must have a unique name. This string is used by the "Help file" author when indicating a screen object to be identified by Coach, then subsequently by Reno when sending messages to Coach. Note that there is no name assigned to "Missing Items" because Coach is not used to identify any missing items.

The following code fragment is the 'hBnd' resources' complete Rez definition.

```
type 'hBnd' {
    integer;            /* Help Version */
    literal longint;    /* Bundle Type 'hmnu',
                            'hrct','hdlg' */
    integer;            /* ID of this type */
    integer;            /* Index number */
};
``` hAsk keyword

In addition to referencing the standard Balloon help resources, the 'hBnd' resource supports a keywords in the resource type field, that is 'hAsk'. This keyword, if used, tells Coach that no resource item exists for the named object and the object being named is a dynamic object and cannot be described by a Balloon resource. Objects of this type, when referenced by Reno, cause Coach to query the application for the location of the object. The mechanism for this communication between Coach and the application is described below.

chlk resource

Another optional resource defined by Coach is the 'chlk' resource. This resource is used to set characteristics of the "chalk" to be used while drawing specific hieroglyphics. The 'chlk' resource defines the shape and style of the graphic to be drawn on the screen.

The 'chlk' has a Rez definition as follows:

```
type 'chlk' {
    integer;    /* chdv ID - hiero definition
    longint;    /* chalk options (chdv spec)
    longint;    /* chalk speed */
    integer;    /* cpct ID for Pict Drawing Color
    integer;    /* cpct ID for Pict Drawing Black/White
};
``` chdv resource

The final resource used by Coach is the 'chdv' resource. Like a 'wdef', this resource is the code segment that does specific drawing on the screen. This resource is a single entry point code segment that executes the drawing commands required to produce the desire effect on the screen. The system of FIG. 1 will automatically have access to a 'chdv' resource for circles, arrows, strike-out, and underlines. Application programmers may also add their own custom chalk-drawing definitions.

Resource location

The Coach resources will always reside in the same file as the existing Balloon resources. Although recommended that all help resources reside in the Reno help file, an application programmer will have the option of putting the Coach resources into the Reno help file or the application file itself.

In many instances, Coach is able to identify the location of the required object by using the Balloon help resources in the application, or the person creating the help content or database may give Coach enough information to locate the object. When this happens, Coach has no need to communicate with the host application.

There are, however, instances when resource information is not sufficient, for instance, dynamic objects such as files and folders in the finder. In those cases where Coach is trying to identify a dynamic object, it will send a query to the application. This query contains a name for the item whose location is requested, as well as any other specific information required for the application to positively identify the item in question. The query tells the application to locate the item (make it visible if necessary) and return a global rectangle identifying its location.

The queries that Coach sends to the application are in the form of Apple events. Apple events are identified by a unique pair of long words in the form of eventClass and eventID. Additionally, when an application responds to a Coach Apple event, it must use Apple events as the response mechanism.

In general, there are two classes of Apple events required by Coach. They are:

| EventClass | Meaning |
|---|---|
| 'CCAp' | Coach is sending a message to an application |
| 'ApCC' | An application is sending a message to Coach |

These classes, in conjunction with their corresponding eventID values, uniquely identify a command or response between Coach and any application (including "CurrentAPP", "Reno", and "Authoring Tool"). The class defines the direction of the message and the eventID field indicates the type of message that is being sent. Additionally, for certain commands, more information is required to complete the desired function, in which case, a key and data are passed along with the command.

Currently, there are eight Apple events defined for the operation of Coach. Unless otherwise noted, all additional data fields are TEXT fields. NIL style name indicates default. Object name of NIL will assume last indexed object.
RenoTheApp Apple events These are Apple events sent from RenoTheApp to Coach.

| | |
|---|---|
| 'erse' | Erase recently drawn |
| 'ndex' | Index to next known object<br>Object number 'iNum' - The index number of Balloon resource to be marked (Optional)<br>Style name 'sNam' - The marking style to be used (Optional)<br>SubRect 'iRct' - (Rect) A sub-rectangle within the item to be marked (Optional) |
| 'mLoc' | Mark location<br>DITL Object number 'iNum' - The index number of dialog item to be marked (Optional, otherwise subRect is used as the enclosing rectangle to draw in)<br>Window name "wNam' - The name of the window to draw on. Special strings include "_FRONTWINDOW_" for the front most window, and "_DESKWINDOW_" is for the desktop window. |

|  |  |
|---|---|
|  | Style name 'sNam' - The marking style to be used (Optional) |
|  | SubRect 'iRct' - (Rect or TEXT) A sub-rectangle within the window or item to be marked (Optional if object number is given). If the right coordinate of the specified rectangle is <= the left coordinate, it is implied that the right coordinate will be set to the right edge of the item or window being marked on. Likewise, if the bottom coordinate of the specified rectangle is <= the top coordinate, it is implied that the bottom coordinate will be set to the bottom edge of he item or window being marked on. To specify a text rectangle, the first four bytes of the passed rectangle must be 'rct=', followed by the coordinates of the rect delimited by commas or spaces (order must be top, left, bottom, right). |
|  | Origin constant 'oCon' - The origin of the rectangle. The specified rectangle will be considered relative from this location. The following constants are defined in ChdvInterface.h to support this command:<br>    ORIGIN_TOP_LEFT    0<br>    ORIGIN_BOTTOM    1<br>    ORIGIN_TOP_RIGHT    2<br>    ORIGIN_BOTTOM_RIGHT    3 |
|  | Location Macro 'lMac' - Identify an object that has a predefined location macro for it. This is the functional equivalent to calling 'mLoc' with multiple parameters (iRct, oCon, wNam), but the parameters have been preset by a resource within the Coach extension. The macro must be specified by name and if non-existent, an error will be returned. This parameter takes precedent over the oCon and iRct parameters, however, the target window can be overridden by specifying an alternate window with the wNam parameter. The following macros are included in Coach:<br>GrowBox  (the growbox of the front window)<br>ZoomBox  (the zoombox of the front window)<br>CloseBox  (the closebox of the front window)<br>TitleBar  (the titlebar of the front window)<br>BootDisk  (the boot disk icon on the desktop) |
| 'mMrk' | Mark Menu<br>Menu Name 'mNam' - The Menu Name to be marked<br>- or -<br>Menu Number 'mNum' - The menu number index (0 is apple menu, 1 is file menu, etc.)<br>Mark style 'sNam' - The making style to be used (Optional)<br>The following is optional, used only when a specific menu item needs to be marked via color or style -<br>Item Name 'iNam' - The Item name to be marked<br>- or -<br>Item Number 'iNum' - The Item Number to be marked within the menu specified above<br>Menu item color 'mCol' - Temporarily set the specified Menu Item (as specified using the above options) to the requested color. Valid colors are:<br>    1 = Black<br>    2 = Yellow<br>    3 = Magenta<br>    4 = Red<br>    5 = Cyan<br>    6 = Green<br>    7 = Blue<br>    8 = White<br>Menu item style 'mFac' - Temporarily set the specified Menu Item (as specified using the above options) to the requested style. Valid styles are any combination of the following:<br>    1 = bold<br>    2 = italic<br>    4 = underline<br>    8 = outline<br>    16 = shadow<br>    32 = condense<br>    64 = extend<br>Taboo rectangle 'tBoo' - A rectangle that is not to be drawn on (could be Reno's portRect, global coordinates) |
| 'draw' | Identify named object<br>Style name 'sNam' - The marking style to be used (Optional)<br>Object name 'o'Nam' - The name of the item to be marked. This name will have been set by the author.<br>Taboo rectangle 'tBoo' - A rectangle that is not to be drawn on (could be Reno's portRect, global coordinates) |

Coach and application Apple events

These are Apple events sent between Coach and the target application. Since Coach is a part of the target application's event stream, they are sending events to themselves in order to communicate.

|  |  |
|---|---|
| 'ware' | Location query<br>Object name o'Nam' - the name of the item to be marked. this name will have been set by they author. |
| 'wRsp' | Location query response<br>Object Rect 'iRct' - (Rect) Requested object's location. This is a response to the 'ware' event. |

Authoring tool Apple events

These are Apple events sent from the authoring tool to Coach.

|  |  |
|---|---|
| 'name' | Rename recently drawn<br>New Item Name 'iNam' - The new name of the object<br>Old Item Name 'oNam' - The old name of the object. (Optional, otherwise last item drawn is assumed) |

Figure 25:
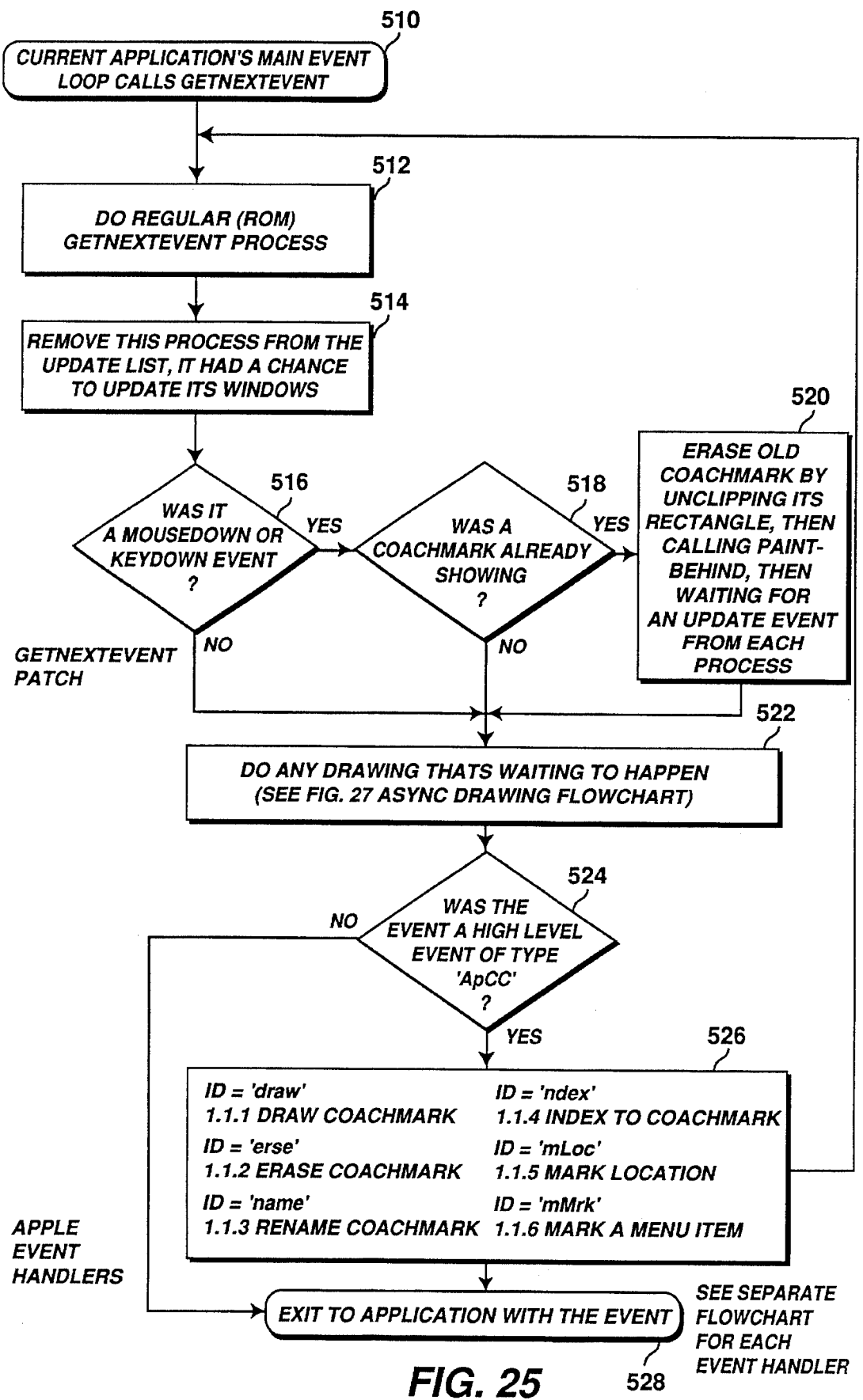
FIG. 25 is a flowchart illustrating the processing within the GetNextEvent patch of the present invention.

Referring now to FIG. 25, Coach's GNE patch generates, sends, and receives Apple events to the current application to get rectangle information for a named object. The Apple events are sent via AESend by both Coach and the application. As the Apple events come in, they are filtered by the GNE patch. While events destined for Coach are captured and are not passed through to the application, events sent from Coach to the application are allowed to pass through. When Coach receives an Apple event from an application, it is treated as a command. Coach will carry out the command (usually marking some user-interface object), and program flow will continue as normal. Result codes are returned by all Apple Event Handlers.

Because Coach is hooked into the GetNextEvent loop, it is guaranteed to get time with each application (it becomes an integral part of every running application). Applications and Coach communicate to each other by sending Apple events (with a destination set to kCurrentProcess). As far as the OS is concerned, the application is just sending application events just to itself, however, in the future, this mechanism may be expanded to allow help messages to be passed from machine to machine.

In order to receive coach events (item location query event), an application must install an Apple Event Handler for event type "CCAp", and ID of 'ware'. When an application gets a Coach message, it must be processed and responded to within the event handler. The response is installed into the response event record passed into the handler function. Any error condition should be reported by the application in the handler result code. Any non-zero result passed back by the Coach Event Handler will cause Coach to not draw any mark.

Interface between Reno and Coach

The Reno help program communicates to the coach code through the same mechanism as a target application. That is to say, Reno sends and receives messages to Coach by way of Apple events sent to the target application.

For example, Reno sends the 'draw' command to tell Coach to identify the named object. The data field of the command contains the name of the object. The name is used by Coach to look up the 'hbnd' resource from which it gets the hot rectangle to identify. When the rectangle is found and marked, Coach responds to Reno with a result code indicating any error for the operation. Coach responds only after it has drawn the graphics. If, however, there is an error, Coach responds immediately, providing the error code to the calling application.

Referring now to FIGS. 24 through 37, the programming steps, decisions and operations of the present invention are illustrated in flow chart form. It will be noted that each decision block and operation of the present invention has been provided with a reference number, for the convenience of the reader and reference. However, for brevity, each of the individual steps are not described in detail, since the function and operation of the present invention will be apparent from the figures and the written description herein.

Figure 24:
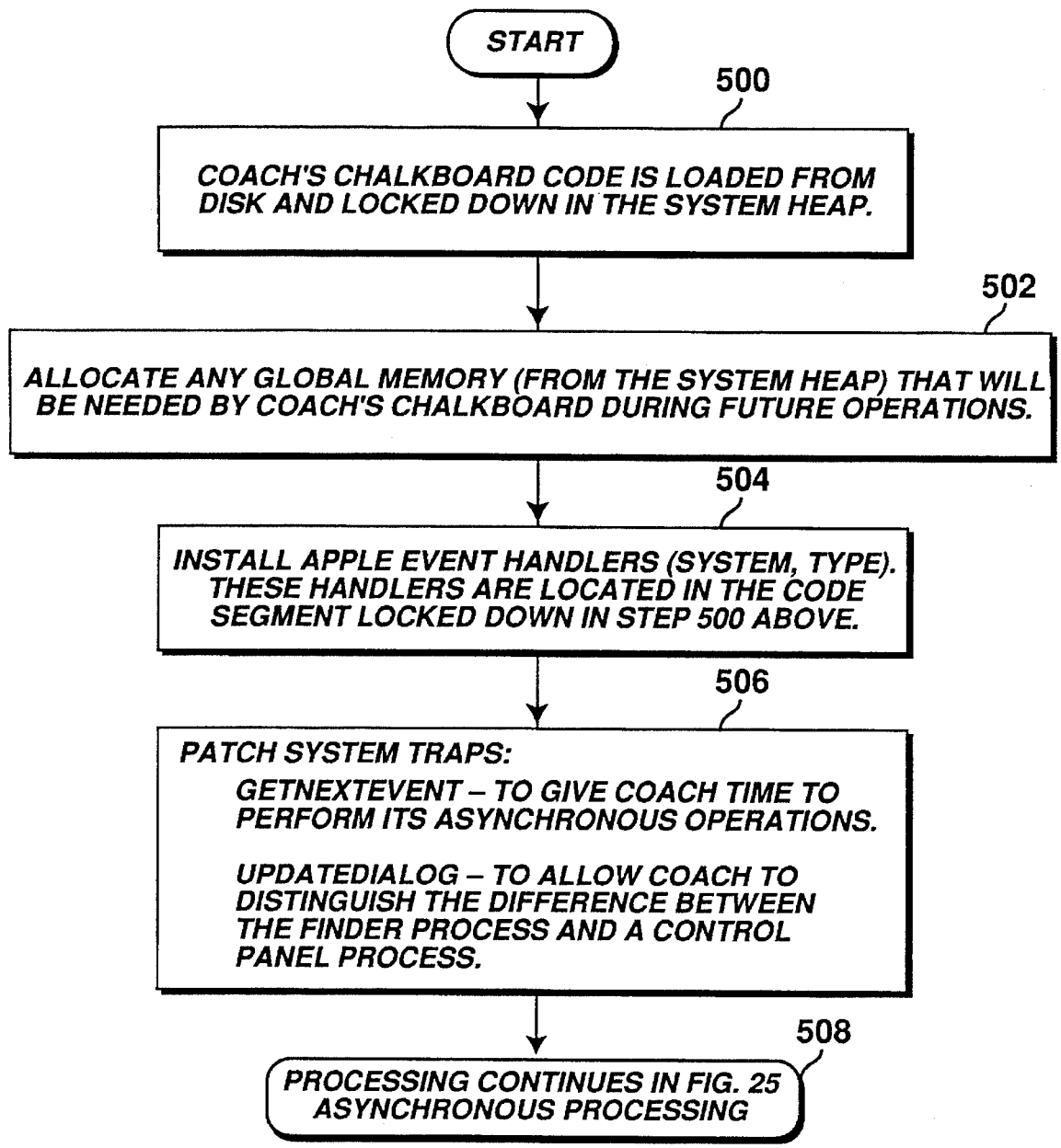
FIG. 24 is a flowchart illustrating the present invention's initialization routines on start up of the computer system shown in FIG. 1.

FIG. 24 is a flow chart illustrating the initialization of the coach code on start up of the computer system illustrated in FIG. 1. As shown in FIG. 25, during the initialization process of the Coach's Chalkboard code (see FIG. 23) a patch is installed on the operating system (OS) Trap "GetNextEvent". The purpose of this patch is to allow capturing of any Apple events that are intended for receipt of the Coach's Chalkboard code. As shown in FIG. 25, Apple events intended for Coach's Chalkboard are intercepted and sent to one of the coach's Apple Event Handlers (see FIG. 28). The flowchart of FIG. 25 illustrates Coach's Chalkboard code's asynchronous processing.

Figure 26:
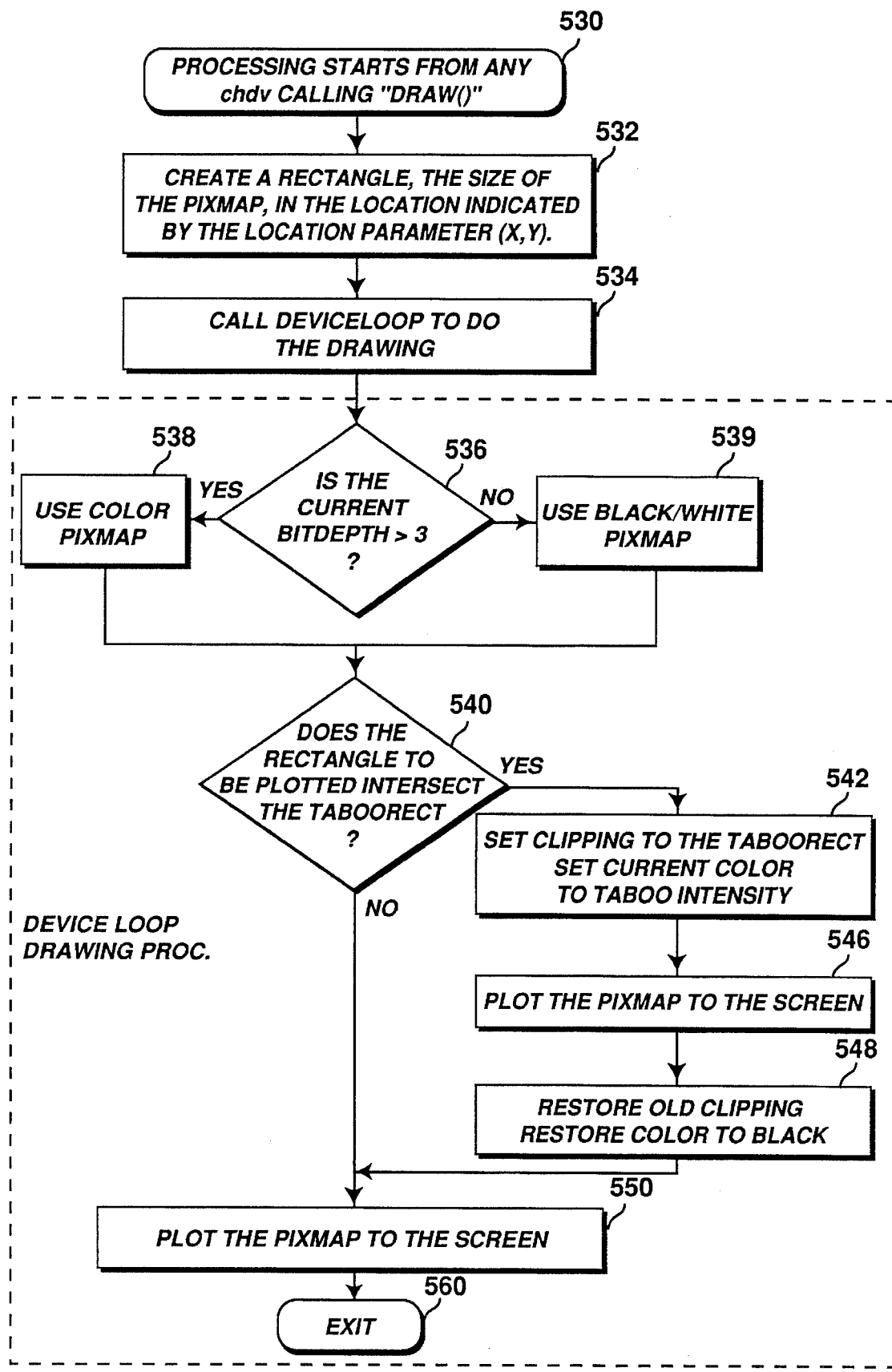
FIG. 26 is a flowchart showing the present invention's sequence of steps for bit depth independent drawing.
Figure 27:
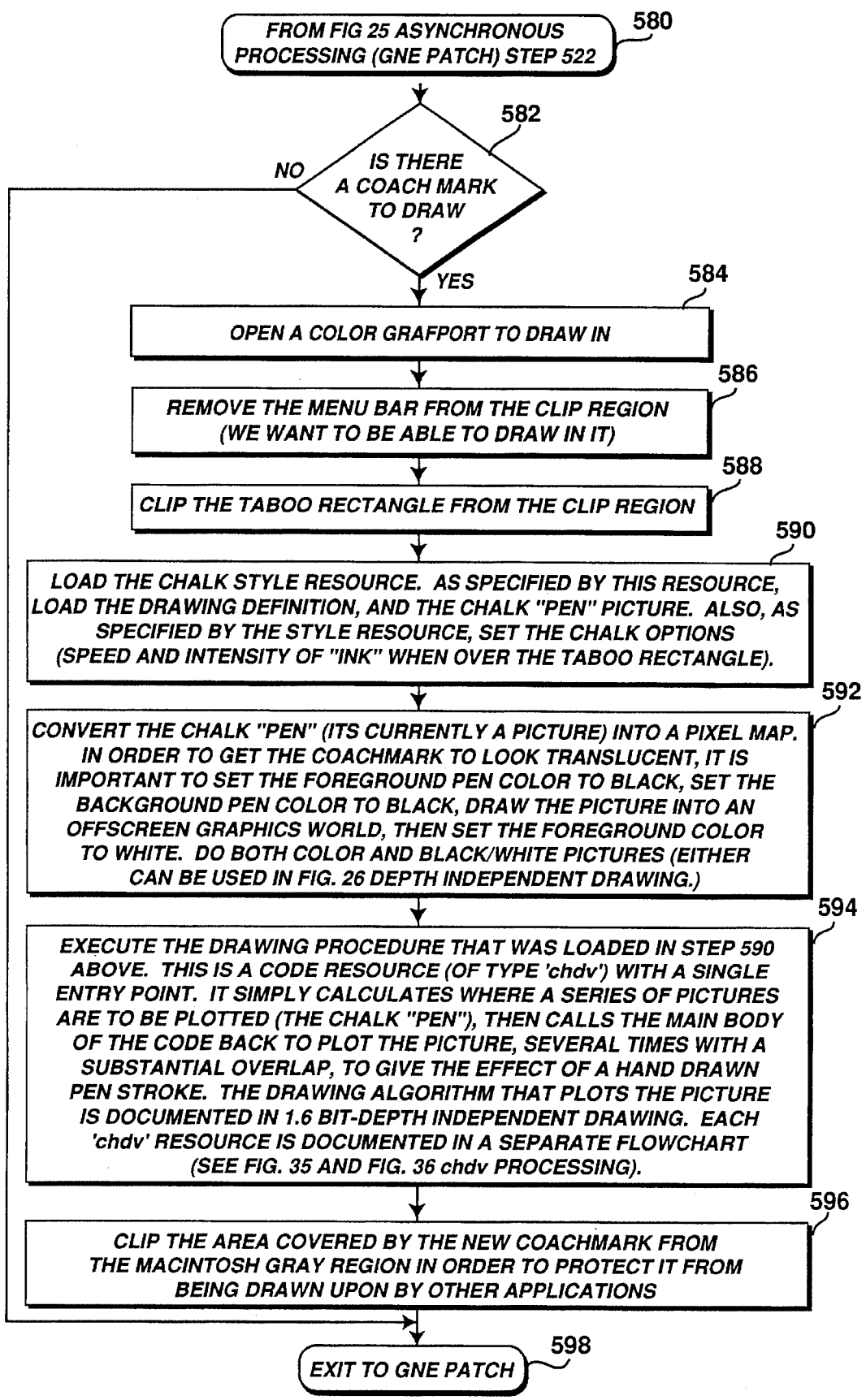
FIG. 27 is a flowchart of the present invention's asynchronous drawing processing routine.

FIG. 26 illustrates a flowchart of the operation of Coach's Chalkboard for bit depth independent drawing. The steps shown in FIG. 26 provide necessary functionality for the Reno program to draw into overlapping monitors (for example, display 40 of FIG. 1) of different bit depth. The code described in FIG. 26 results in an off screen pixmap to be plotted into a location described by parameters provided by a 'chdv' routine (see for example FIGS. 35–37). The mathematics of the "chdv" routine calculates a pen path on which multiple pixmaps are to be plotted. FIG. 27 is a flow chart of the asynchronous drawing processing routine. The generation of a coach mark involves rendering complex drawings on the display, and large amounts of memory, therefore, all drawing (and much of the pre-drawing-processing) must be done at "safe time" (or, non-interrupt time). Through the GNE patch (described in the Async processing flowchart of FIG. 25), this function is called upon to determine if there are any coach marks to be drawn and, if so, to draw them.

Figure 28:
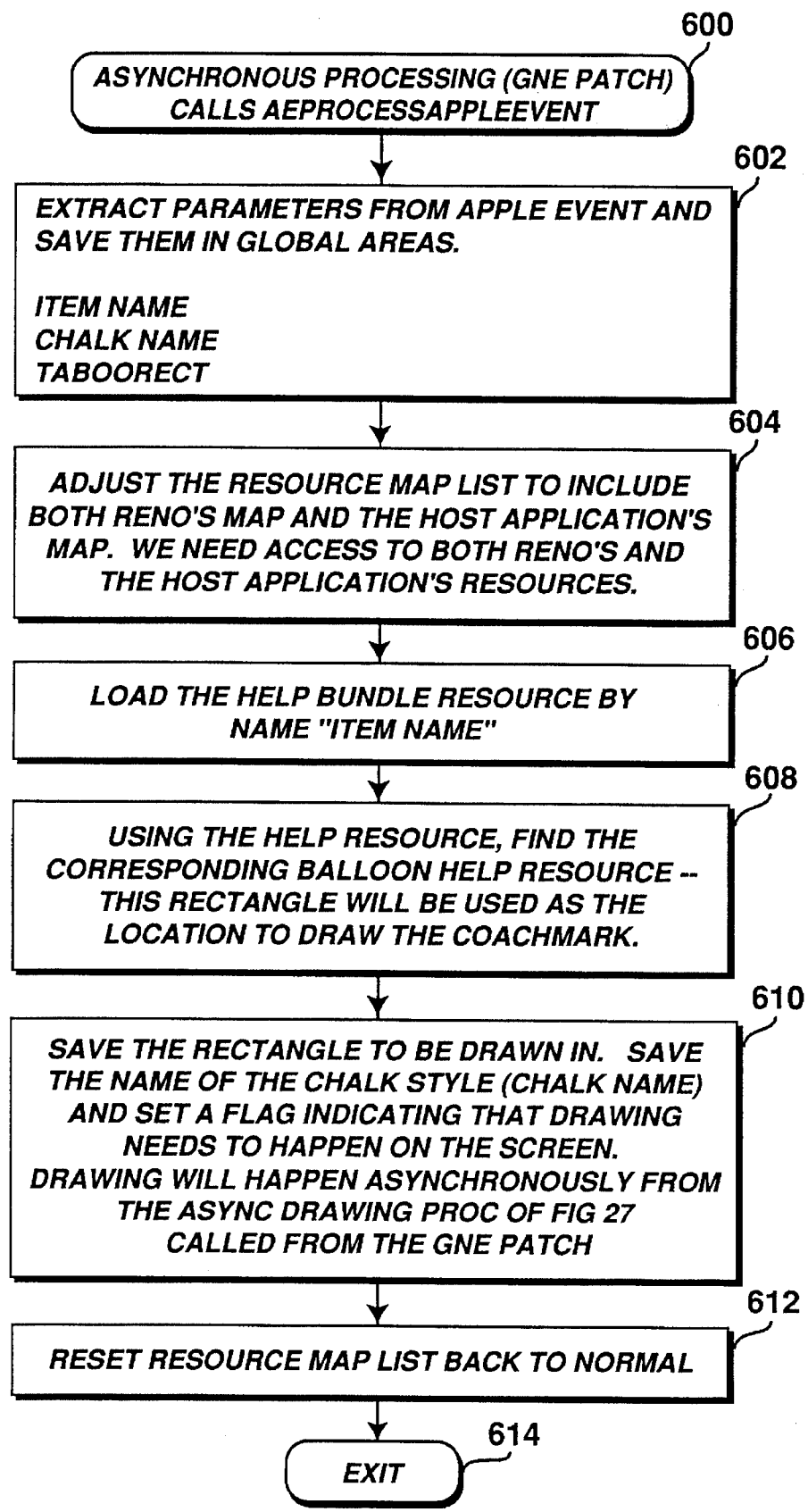
FIG. 28 is a flowchart illustrating the present invention's Apple Event Handler processing.

FIG. 28 illustrates Apple Event Handler processing. During initialization, Coach's Chalkboard functions. All of coach's Apple events are of type 'ApCC'. When Coach intercepts such an event (from the GNE patch) it executes an Apple Event Handler, one of which being the code described by the flowchart of FIG. 28.

The Reno application can send a 'draw' Apple Event to Coach's Chalkboard. The purpose of this event is to tell Coach to identify a user interface feature for the user with a mark known as coach mark. When Coach intercepts such an event (from the GNE patch), it executes the code described by the flowchart of FIG. 28. The user interface feature to be identified (by circling, underline, etc.) is identified by name (a parameter in the Apple Event)—the name corresponds to the name of a help bundle resource—that resource helps Coach find the user interface feature. Another parameter in this Apple Event is the chalk name, this parameter identifies, by name, the resource that identifies the parameter that Coach will use to draw the Coach mark. The final parameter to this Apple Event is the TabooRect—this rectangle specifies an area on the screen (in global coordinates) that should be drawn on with reduced intensity, it is typically used to identify the rectangle covered with Reno windows, such that all drawing over Reno windows look noticeably different from drawing over any other windows on the display.

Figure 29:
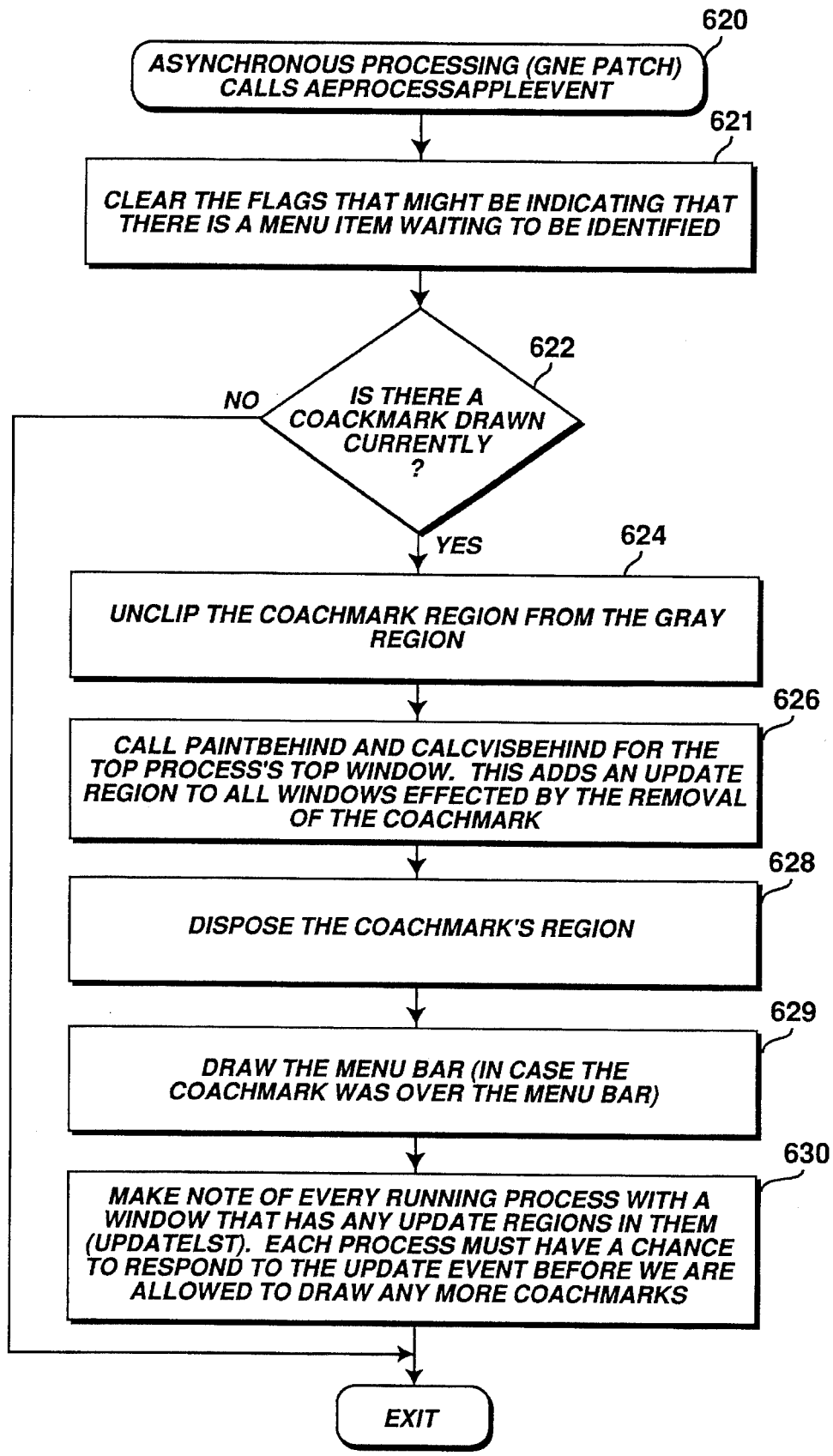
FIG. 29 is a flowchart of the present invention's Apple Event Handler for erasing a coach mark from the display.
Figure 30:
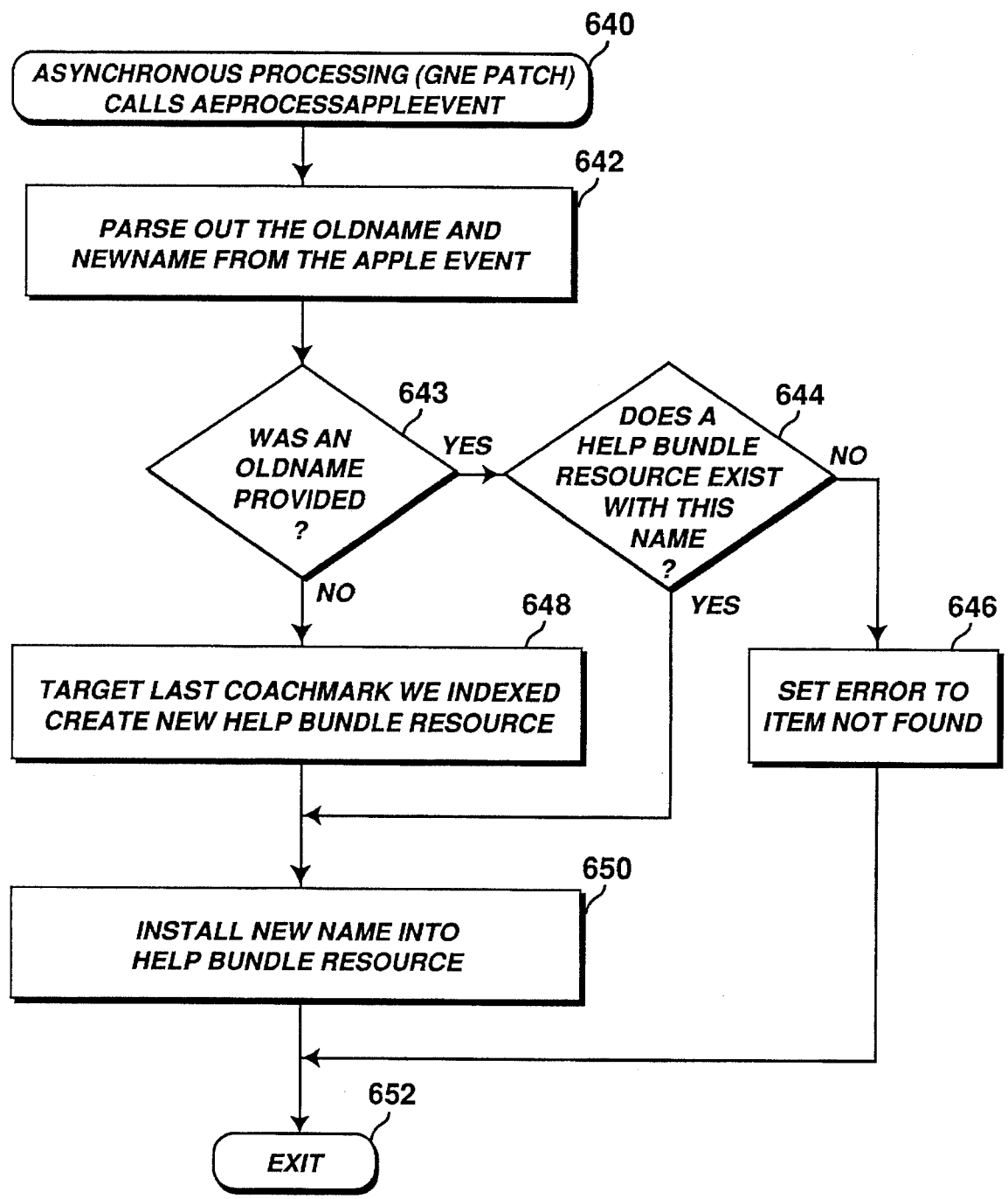
FIG. 30 is a flowchart of the coach mark rename process for renaming a previously drawn coach mark.
Figure 31:
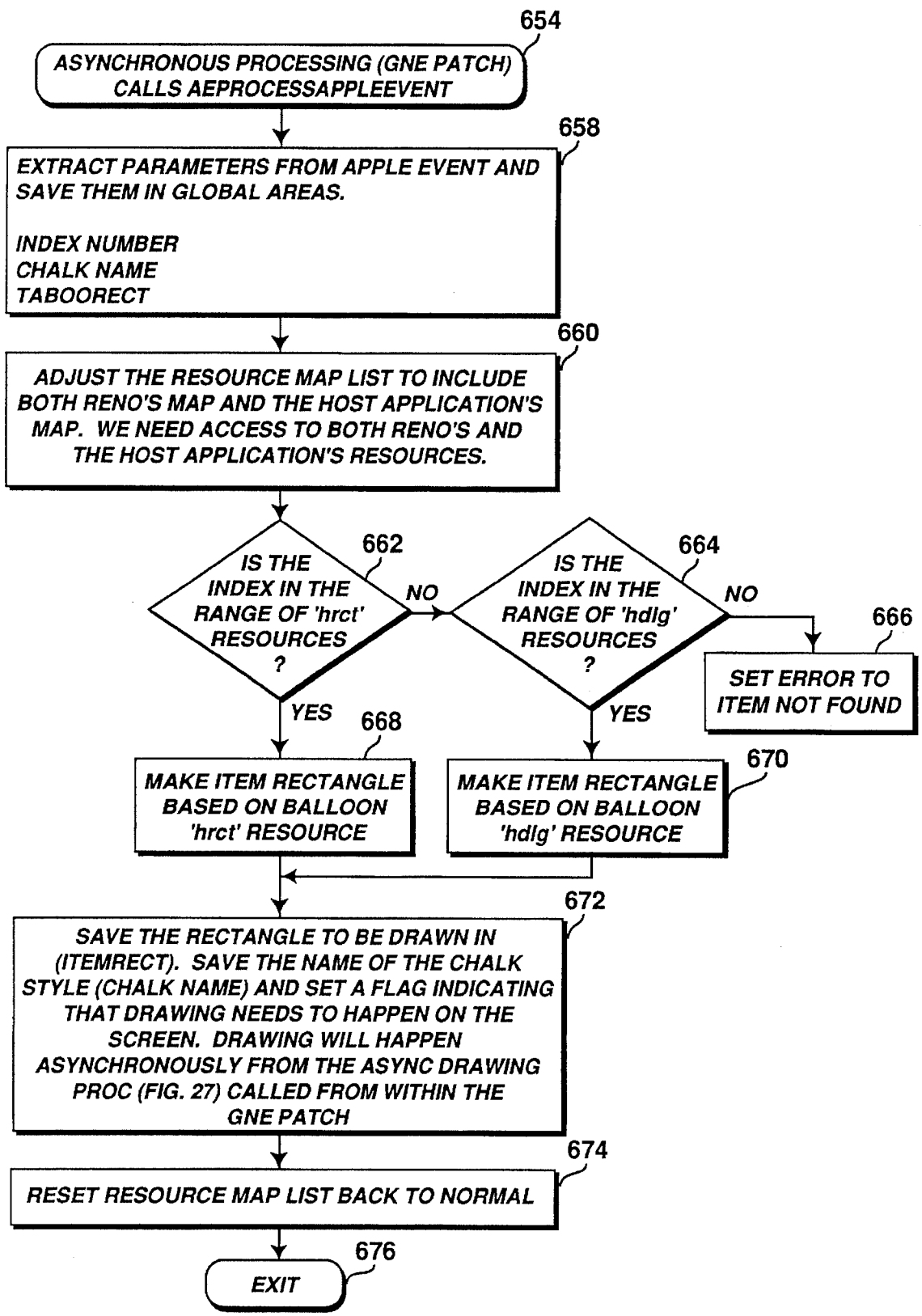
FIG. 31 is a flowchart of the present invention's index Event coach mark.
Figure 32:
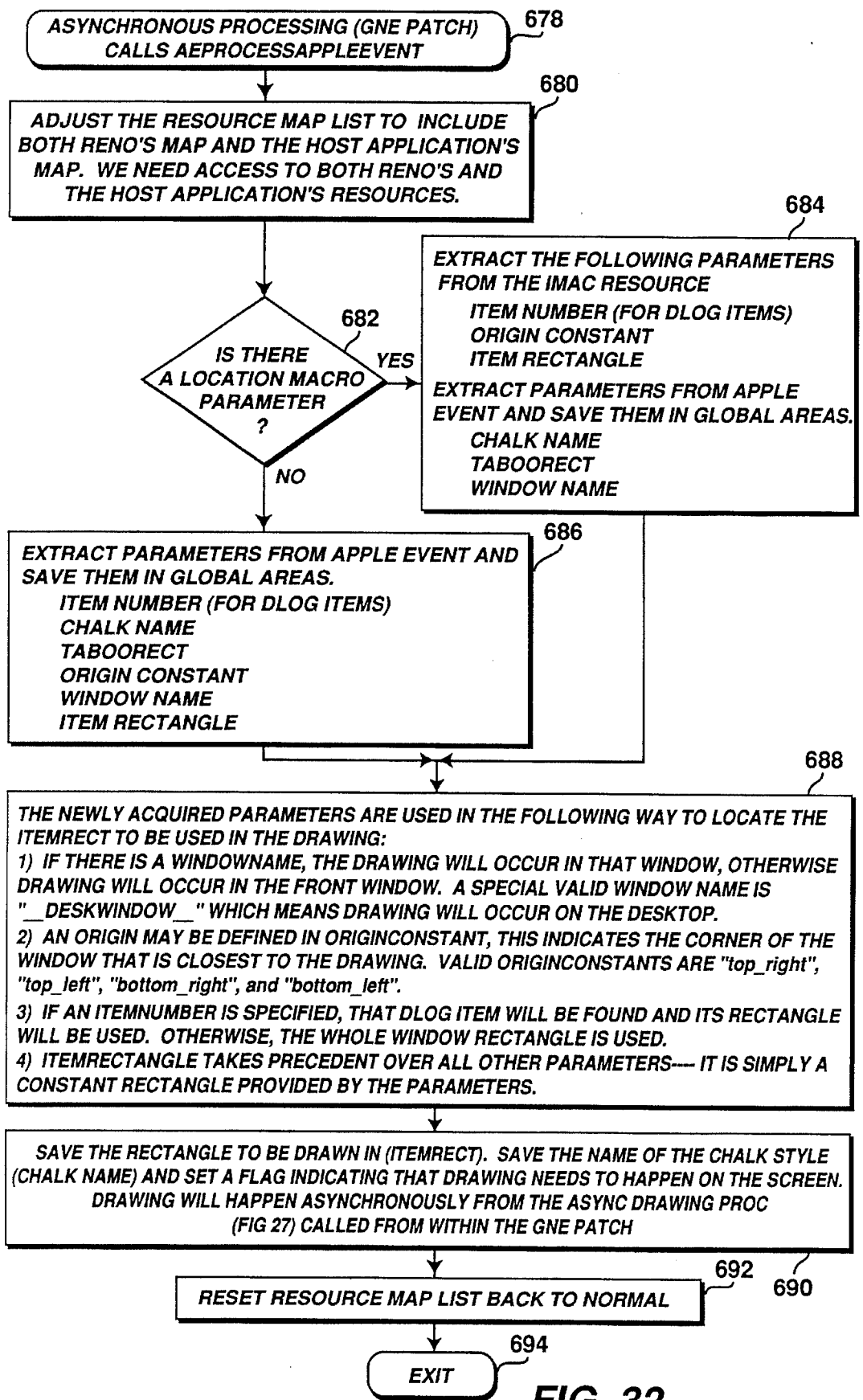
FIG. 32 is a flowchart of the mark location routine to mark a specific location of the display.
Figure 33:
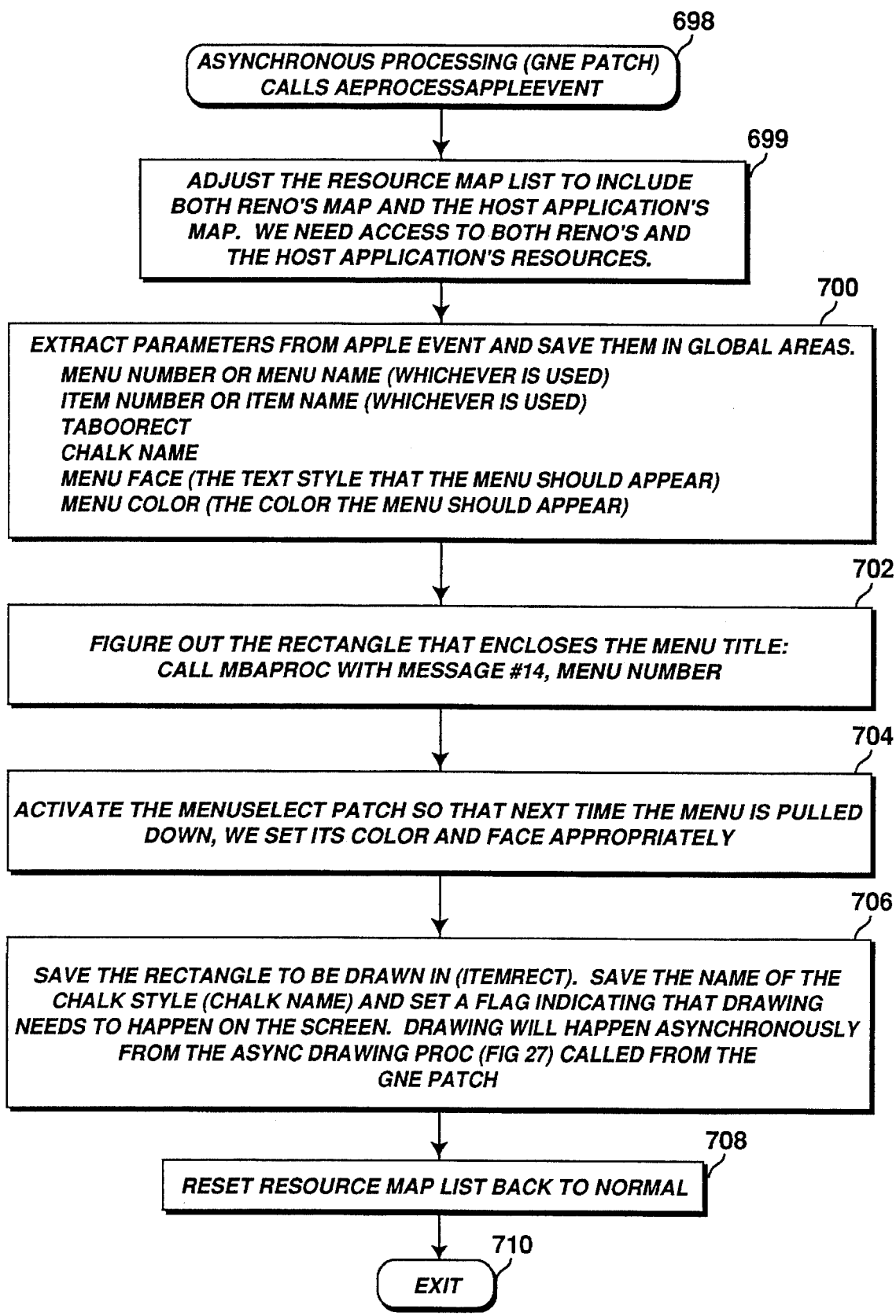
FIG. 33 is a flowchart illustrating the mark menu process to mark a specific menu on the display screen.

Referring now to FIG. 29, the Apple Event Handler for erasing a coach mark is shown. As previously discussed, during initialization, Coach's Chalkboard installs a suite of Apple Event Handlers. These handlers add functionality to Reno to enable all of Coach's Chalkboard functions. All of Coach's Apple events are of type 'ApCC'. When Coach intercepts such an event (from the GNE patch), it executes a Apple Event Handler, one of which being the code described by this flowchart. Reno can send a 'erse' Apple Event to Coach's Chalkboard. The purpose of this event is to tell Coach to erase a previously drawn Coach mark. FIG. 30 is a flowchart illustrating the coach mark rename routine for supporting a "name" Apple Event. The purpose of the "name" Event is to rename a help bundle resource associated with the named coach mark. FIG. 31 is a flowchart illustrating the present invention's index "ndex" Apple event. The purpose of the "ndex" event is to request the coach code to identify the next known (by using Balloon help) user interface item. This command is normally used in conjunction with "name" to create help bundles for user interface items. FIG. 32 is a flowchart of the "mloc" routine to request Coach to mark a specific location on display 40, regardless of whether the location has a Help bundle resource associated with it. FIG. 33 is a flowchart illustrating the "mmrk" Apple event to request that the coach code to mark a specific menu on the display screen 68 of FIG. 1.

Figure 34:
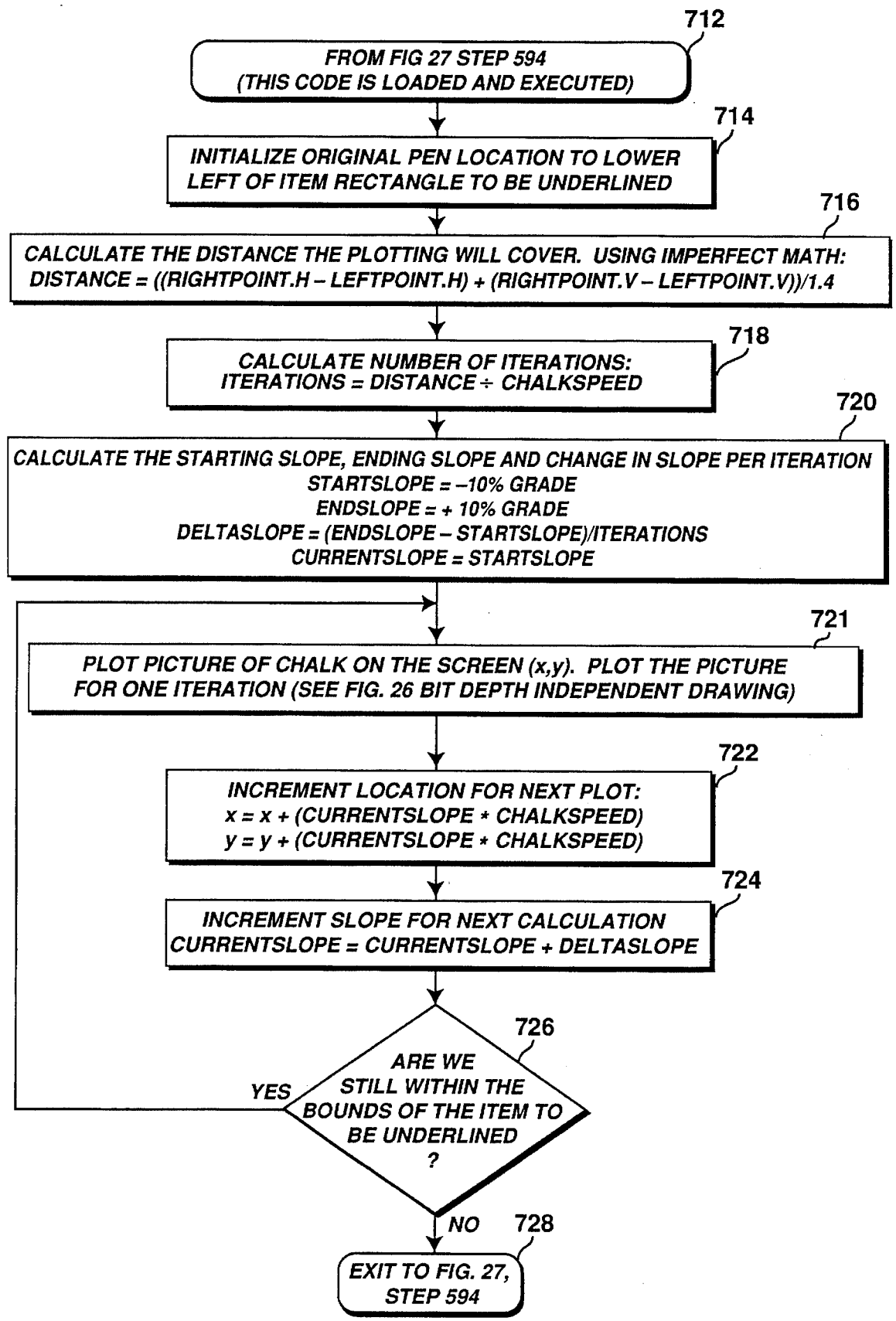
FIG. 34 a flowchart of the steps used by the present invention to draw an underline coach mark on the display screen.
Figure 38D:
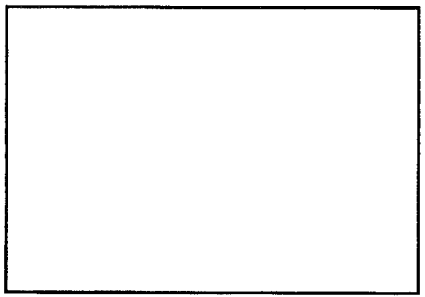
Figure 38D:
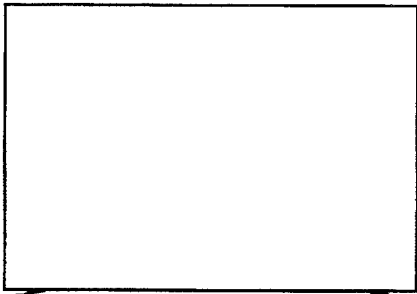
Figure 38D:
Figure 38D:
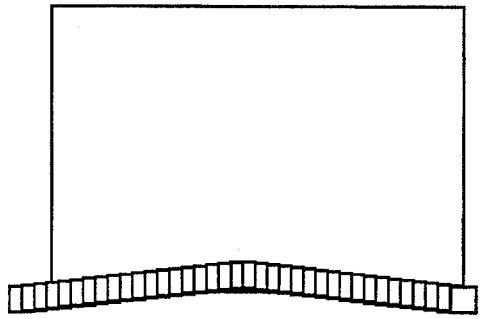

Referring now to FIG. 34, a flowchart is illustrated which the present invention's Coach code utilizes to draw an underline Coach mark, as shown in FIGS. 20 and 38(a)–38(d). As previously described, the "chdv" code modules are the mathematics routines that allow the present invention's Coach's Chalkboard program to draw pseudo-geometric shapes on the screen. The shapes are intentionally distorted to give the effect of imprecise human drawing. The shapes are all drawn by repeatedly plotting a color Macintosh® picture over and over again with substantial overlap in a specified direction. The body of code described in this flowchart simply calculates the locations to plot the Macintosh® pictures and repeatedly calls a centralized routine to do the actual drawing. As illustrated in FIGS. 34 and 38, the underline Coach mark is drawn by first setting the start and end points to the lower left and lower right of the screen item to be underlined. Starting and ending vectors are then calculated (See flowchart of FIG. 34, step 720). CPU 52, under the direction of the Coach code, begins plotting pen pictures from the start point, then adjusts the location of the next pen picture to overlap the last plotted pen picture in accordance with the vector. The vector value (FIG. 34) is adjusted with each iteration while approaching the end point. As shown in FIG. 38(d), CPU 52 continues plotting and incrementing until the pen point is just outside the item rectangle.

Figure 36:
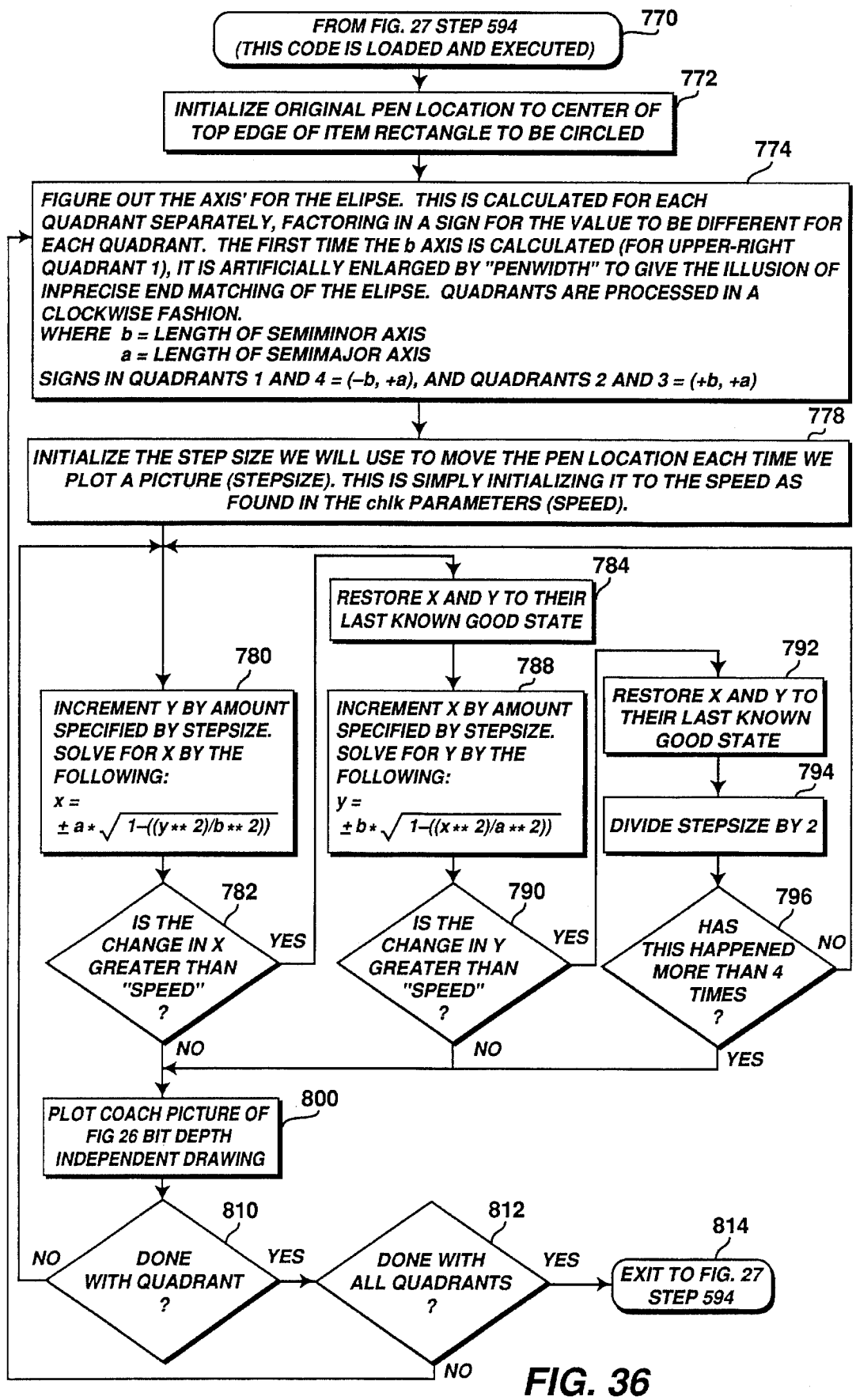
FIG. 36 is a flowchart of the steps used by the present invention to draw a circle coach mark.

Referring now to FIG. 36, a flowchart is illustrated which describes the steps that the present invention utilizes to draw a circle Coach mark, as shown in FIGS. 16, 17, 18 and 40. As previously described, the "chdv" code modules are the mathematics routines that allow the present invention's Coach's Chalkboard program to draw pseudo-geometric shapes on the screen. The shapes are intentionally distorted to give the effect of imprecise human drawing. The shapes are all drawn by repeatedly plotting a color Macintosh® picture over and over again with substantial overlap in a specified direction. The body of code described in this flowchart calculates the locations to plot the Macintosh® pictures and repeatedly calls a centralized routine to do the actual drawing.

Figure 40A:
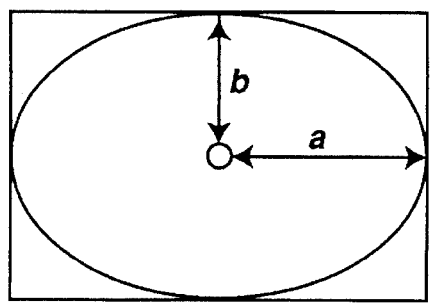
FIGS. 40(a), 40(b), 40(c), 40(d), 40(e) and 40(f) conceptually illustrate the rendering of a circle coach mark by the present invention.
Figure 40B:
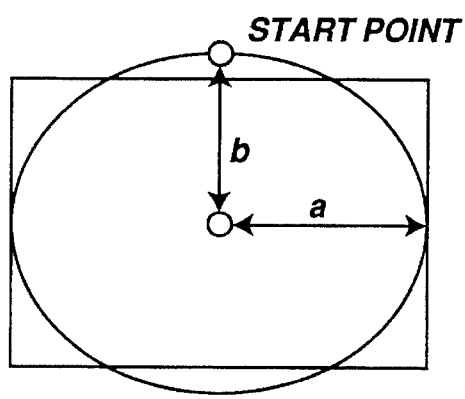
Figure 40E:
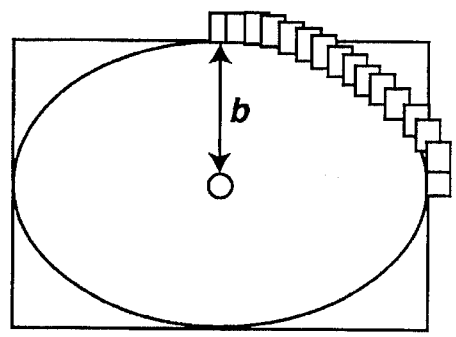
Figure 40C:
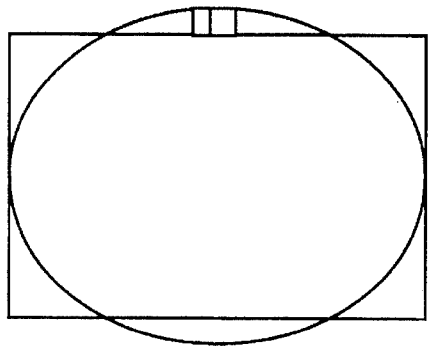
Figure 40F:
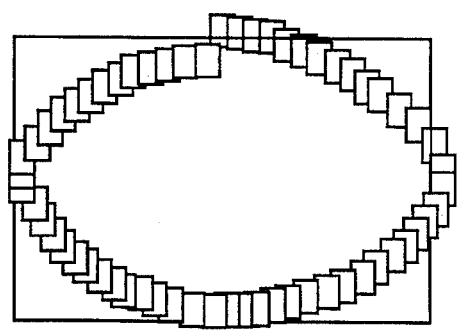
Figure 40D:
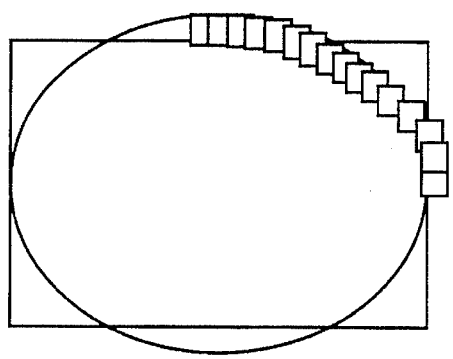

As illustrated in FIGS. 40(a)–40(f), the circle Coach mark is first drawn by calculating the axes for the ellipse "a" and "b" (See FIG. 40(a)). The CPU 52 begins to draw in quadrants of the ellipse. For the first quadrant, the "b" axis is artificially extended by the height of the pen point's rectangle, and a start point is calculated at the top of the ellipse. The CPU 52 then begins to render and plot pen pictures from the start point, and recalculate the ellipse at each point (See FIG. 40(c)). As shown, the CPU 52 continues plotting and recalculating until the first quadrant has been plotted (FIG. 40(d)). The CPU 52 then resizes the "b" axis to the original length and continues to plot the original length and continues to plot the second, third and fourth quadrants (See FIG. 40(f)). In the presently preferred embodiment, the equation used for the ellipse calculation is:

$$x = +-a*SQRT(1-((Y2)/(B2)))$$

Figure 37A:
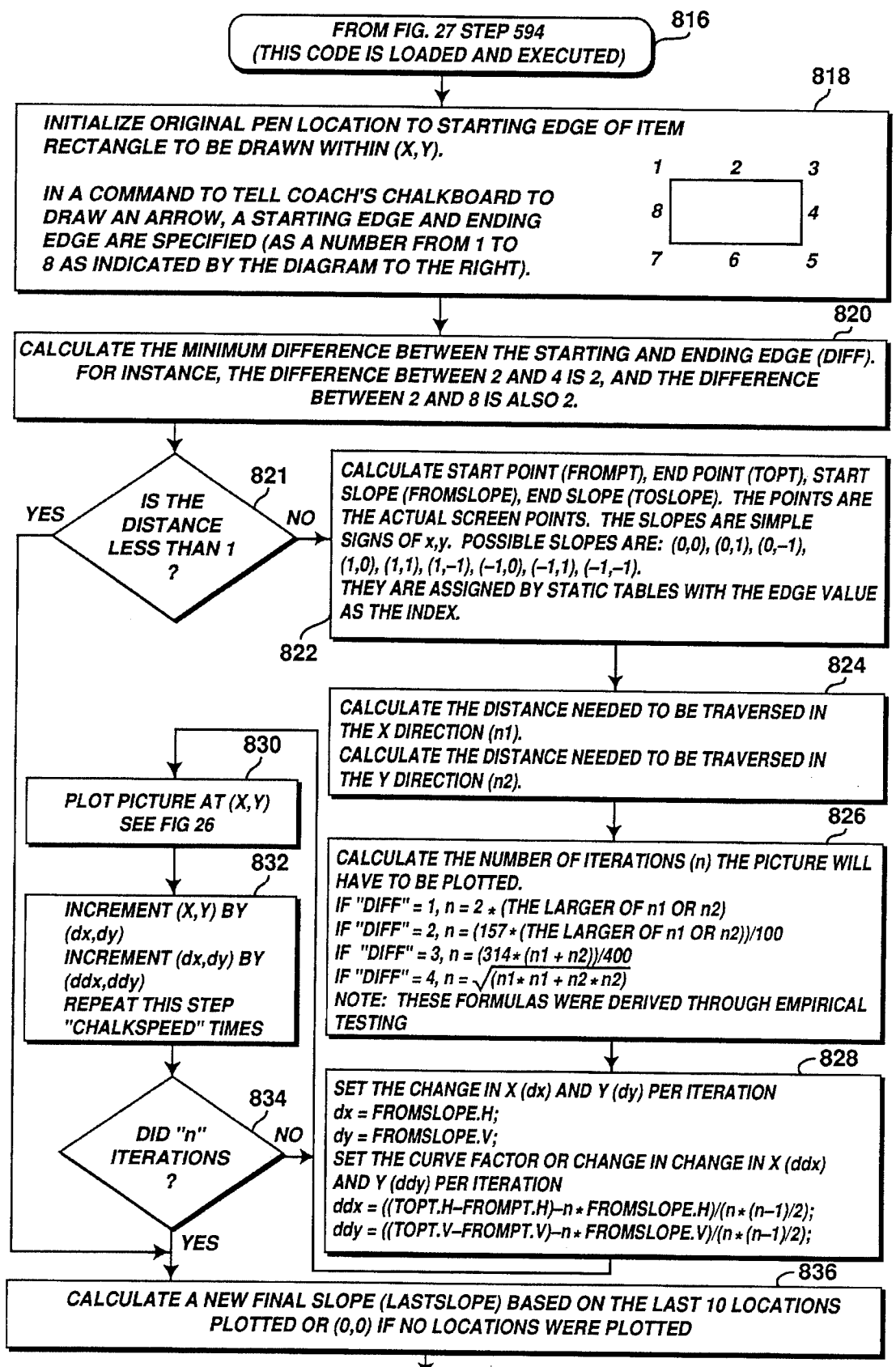
FIGS. 37(a) and 37(b) are flowcharts of the steps used by the present invention to draw an arrow coach mark.
Figure 37B:
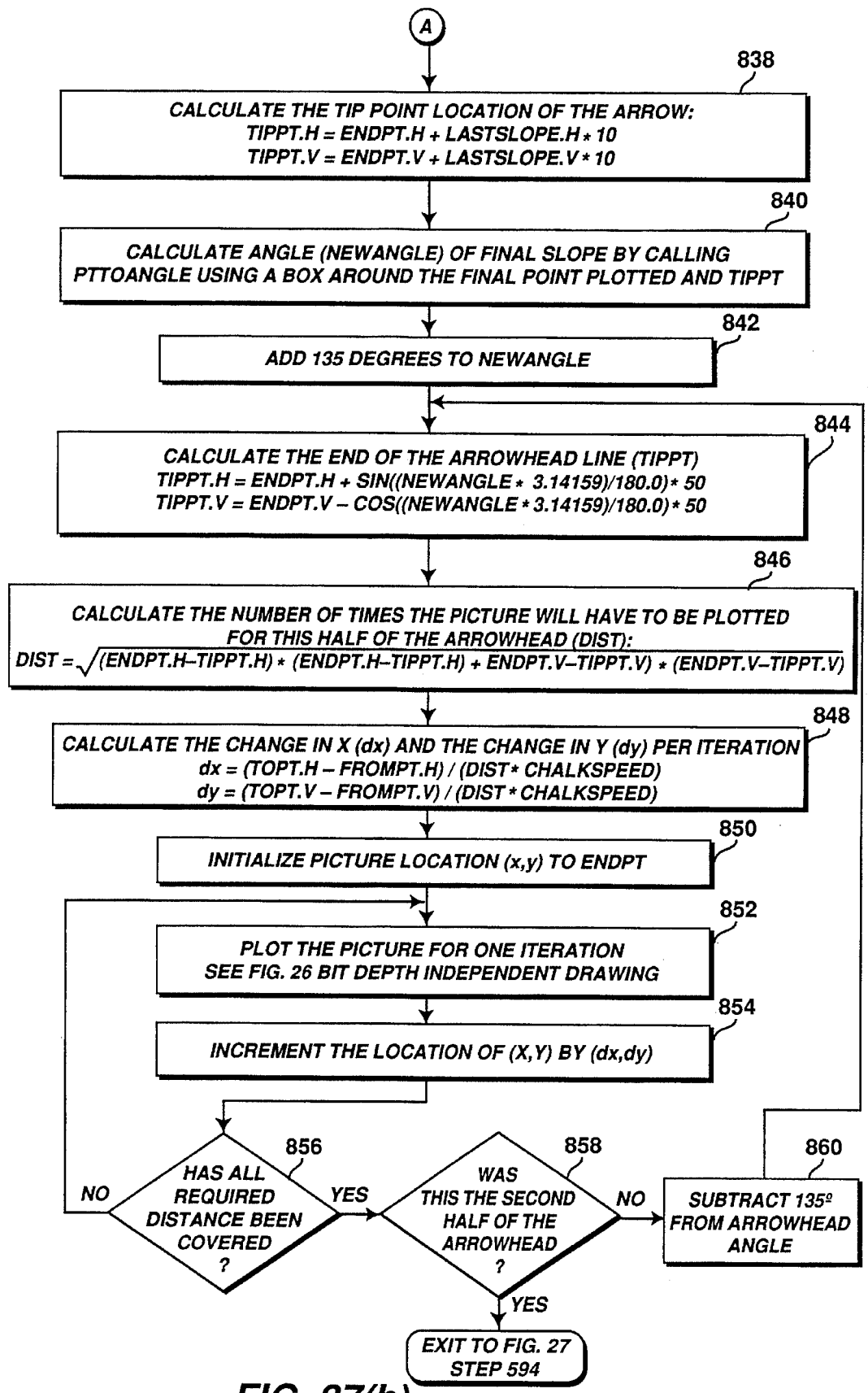

Referring now to FIGS. 37(a) and 37(b), a flowchart is illustrated which describes the steps utilized by the present invention to draw an arrow Coach mark, shown in FIGS. 21, 22 and 41. As disclosed in the flowcharts, and shown in FIG. 41(a), the arrow is drawn by the CPU 52 first setting the start point and end point of the arrow. As illustrated in FIG. 41(b), points on the item rectangle are identified by locations one through eight. The CPU 52 then calculates the starting and ending vectors (See FIG. 37(a), Step 822), and the change in slope using "imperfect math" (See FIG. 37(a), Steps 826 and 828). CPU 52 then begins to plot pen pictures from the start point, and adjusts the next location by vector. In addition, the vector value is adjusted at each plot iteration while approaching the endpoint (See FIG. 41(d)).

Figure 41A:
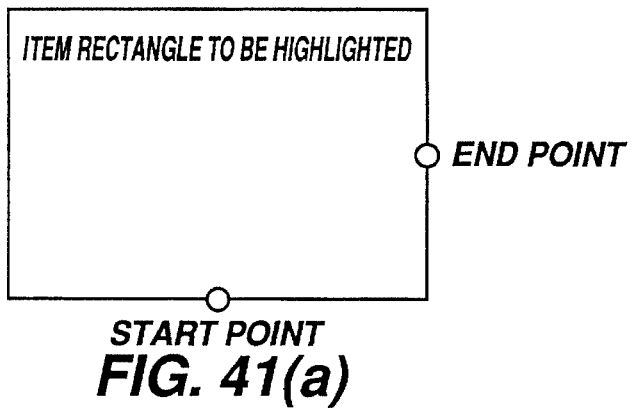
FIGS. 41(a), 41(b), 41(c), 41(d), 41(e), 41(f), 41(g), and 41(h) conceptually illustrate the rendering of an arrow coach mark by the present invention.
Figure 41B:
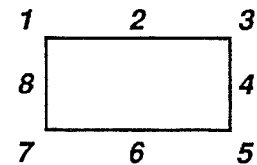
Figure 41C:
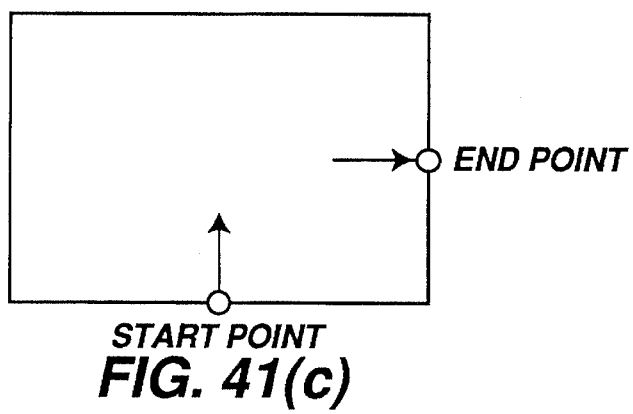
Figure 41F:
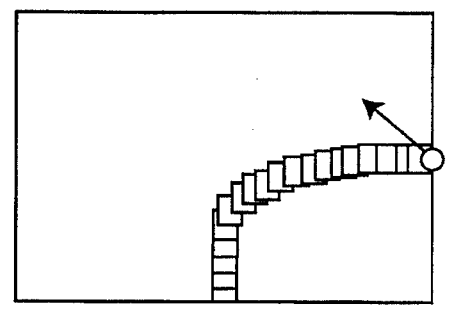
Figure 41D:
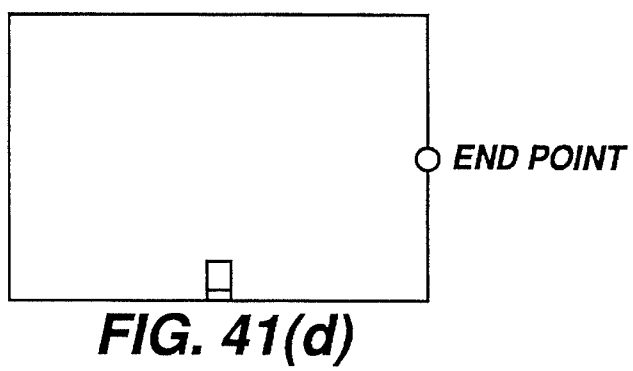
Figure 41G:
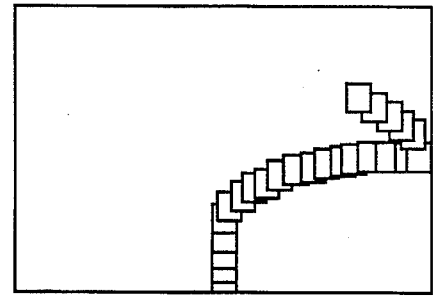
Figure 41E:
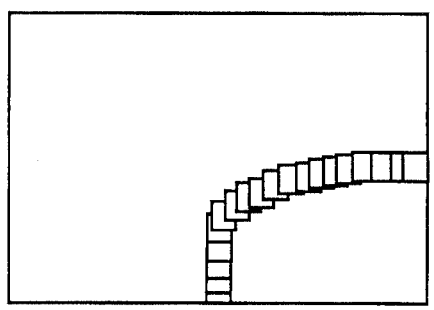
Figure 41H:
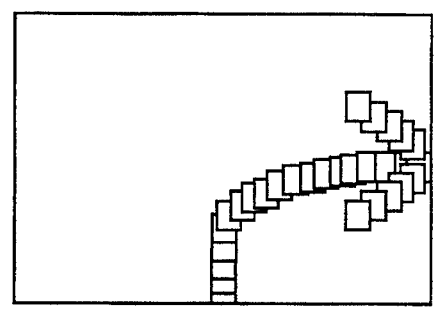

As shown in FIG. 41(e)), CPU 52 continues plotting and incrementing until the pen point is plotted just outside the item rectangle. The arrowhead is then rendered by calculating a vector for the first line of the arrowhead (FIG. 41(f)). CPU 52 then plots the pen picture along the vector until the maximum arrowhead length is reached. Another vector is calculated for the second half of the arrowhead and plotted as shown in FIGS. 41(g) and 41(h).

Figure 35:
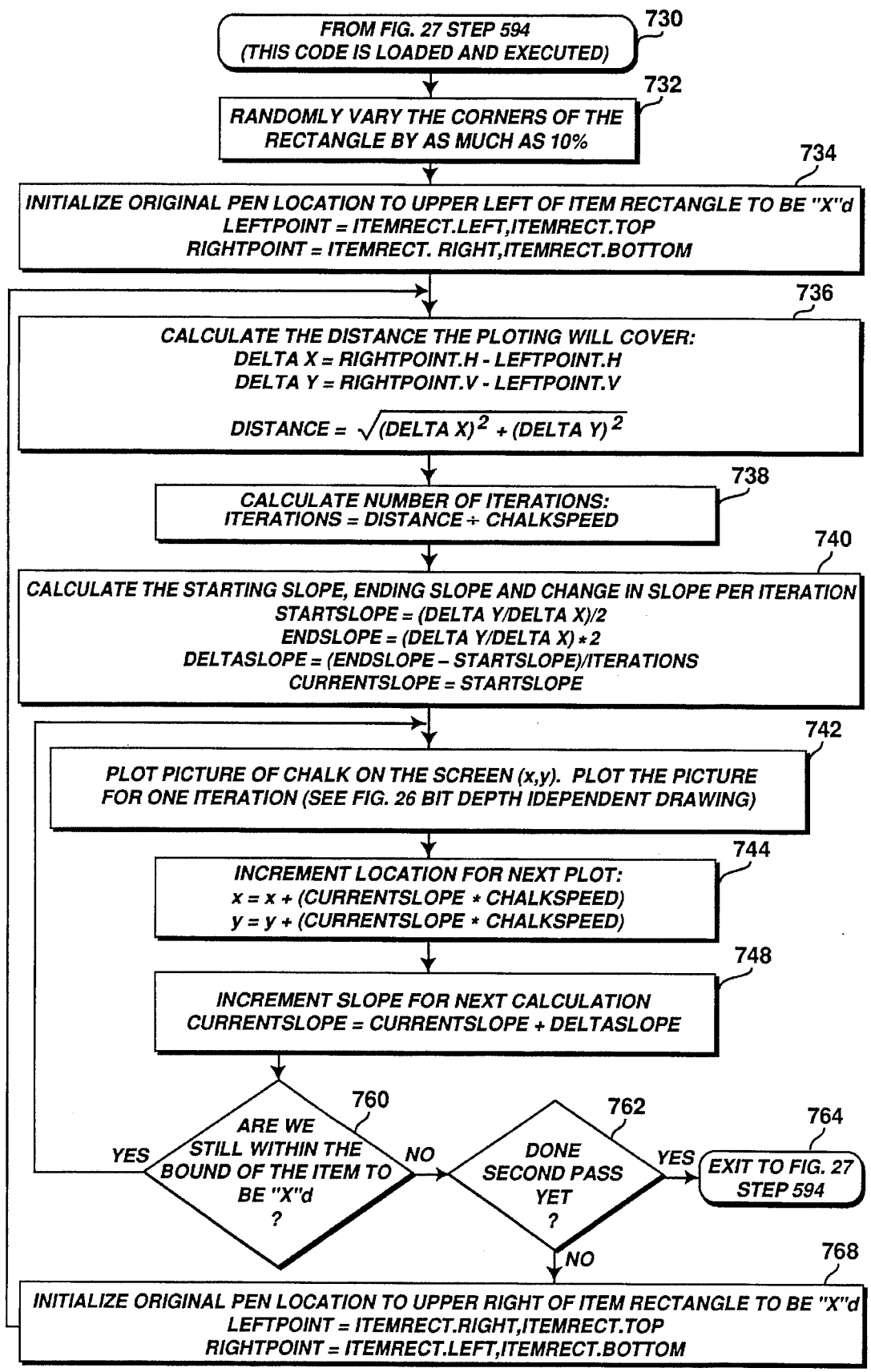
FIG. 35 a flowchart of the steps completed by the present invention to draw an X coach mark on the display.

Referring now to FIGS. 35 and 39, the method of the present invention is described for drawing an "x" Coach mark, shown in FIG. 19. As illustrated in FIG. 39(a), CPU 52 selects start and end points by randomly adjusting the position of the points up to 10 percent outside of the corners of the item rectangle (See FIG. 35, step 732). The starting and ending vectors are calculated (See FIG. 35, step 740) as well as the change in slope per iteration (See FIG. 39(b)).

Figure 39A:
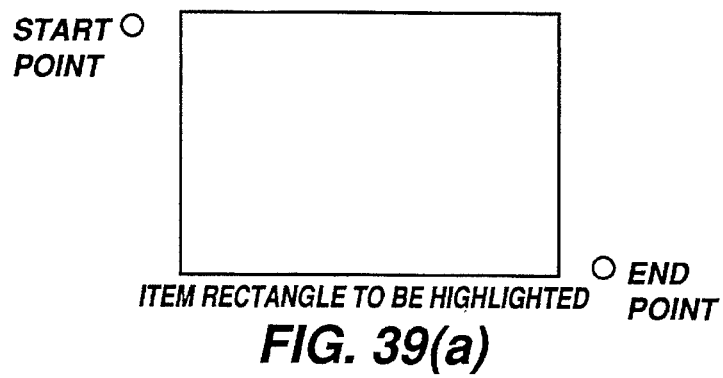
FIGS. 39(a), 39(b), 39(c), 39(d), and 39(e) conceptually illustrate the rendering of an X coach mark on the display.
Figure 39B:
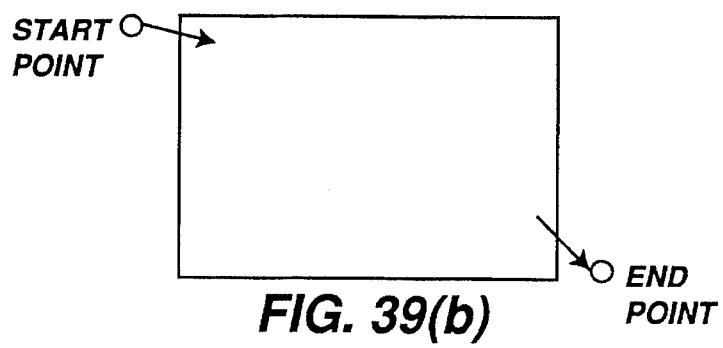
Figure 39C:
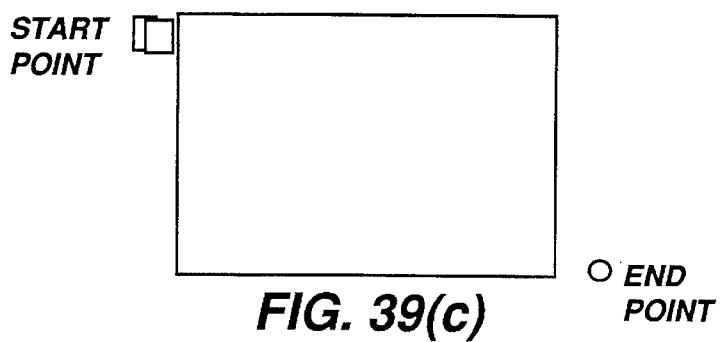
Figure 39D:
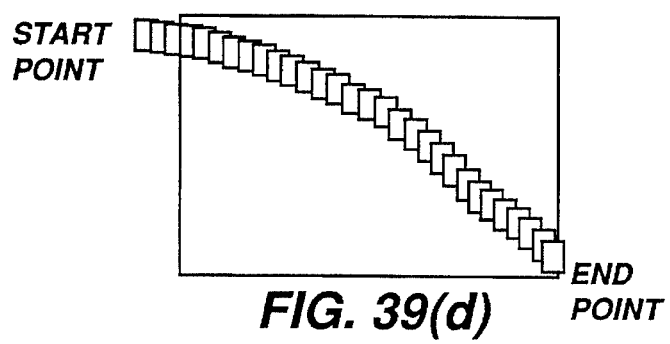
Figure 39E:
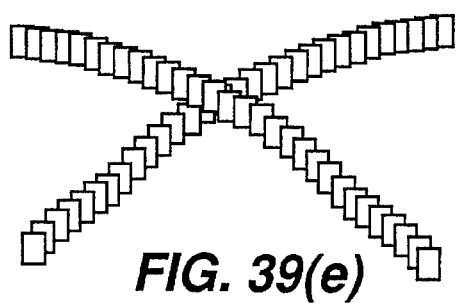

CPU 52 then begins plotting pen picture, beginning from the start point, then adjusting the location of the next plot by vector. In addition, the vector itself adjusted at each iteration while approaching the end point. The pen points continue to be plotted and incremented until the pen plot is just outside the item rectangle (See FIG. 39(d)). As shown in FIG. 39(e), opposite start and end points are defined for the opposing side of the "x" Coach mark, and the process is repeated to complete the mark.

While the present invention has been described with reference to FIGS. 1 through 41, it will be appreciated that the figures are for illustration only, and do not limit the spirit and scope of the invention. For example, although the figures have, by necessity, used example windows having certain attributes, icons and/or functions, it will be appreciated that the invention is not limited by the specific examples provided. Rather, the present invention has application in any window-based graphic user interface display system. In addition, it will be noted that the present invention may be realized using a variety of computer programming languages and hardware, and is not limited to any particular hardware or software.

Moreover, it will be appreciated that certain features and aspects of the present invention, such as the present invention's use of visual cue coach marks, are not static events and are perceived by the user as having motion. Due to the limitations of a written specification, the reader is referred to a video tape entitled "Reno Macintosh Help", and a software program under the same name, submitted by the applicant concurrent with the filing of the application on which this patent is based.

What is claimed is:

1. In a data processing display system having a display, a method for providing visual cues to a user comprising the steps of:

(a) displaying on said display a user interface having a plurality of objects; and (b) automatically drawing on said display a coach mark having at least one geometric shape to visually identify at least one of said objects on said user interface to said user, wherein said coach mark is formed by a plurality of pen pictures, wherein each of said plurality of pen pictures is a pixel map having at least two vertically aligned pixels and at least two horizontally aligned pixels, wherein the automatically drawing step (b) includes the steps of:

(i) drawing on said display an initial pen picture for said coach mark, and (ii) iteratively drawing on said display additional pen pictures for said coach mark over time until said coach mark has been fully rendered on said display.

2. The method of claim 1, wherein the iteratively drawing step (b)(ii) comprises the step of iteratively drawing on said display said additional pen pictures such that said additional pen pictures overlap one another.

3. The method of claim 1, wherein said initial pen picture and each of said additional pen pictures are rectangular in shape.

4. The method of claim 1, wherein said coach mark identifies a location on said display for data input by said user.

5. The method of claim 1, wherein said coach mark is displayed in color.

6. The method of claim 1, wherein said coach mark is translucent.

7. The method of claim 1, wherein said coach mark is drawn in response to said user providing a first signal.

8. The method of claim 7, wherein said user provides said first signal by inputting a help inquiry.

9. The method of claim 1, comprising the step of displaying at least one of said objects in a window on said display.

10. The method of claim 9, wherein said coach mark identifies one of said at least one object within said window.

11. The method of claim 1, wherein said coach mark is shaped as an arrow.

12. The method of claim 11, wherein the automatically drawing step (b) comprises the steps of:

defining a starting point and an ending point for a shaft of said coach mark, calculating a starting slope, an ending slope, and a delta slope for said shaft, plotting pen pictures on said display from said starting point to said ending point in accordance with said starting slope, said ending slope, and said delta slope, calculating a first arrowhead slope and a second arrowhead slope for an arrowhead of said coach mark, and plotting pen pictures on said display in accordance with said first arrowhead slope and second arrowhead slope.

13. The method of claim 1, wherein said coach mark is linear in shape.

14. The method of claim 13, wherein the automatically drawing step (b) comprises the steps of:

defining a starting point and an ending point, calculating a starting slope, an ending slope, and a delta slope, and plotting pen pictures on said display from said starting point to said ending point in accordance with said starting slope, said ending slope, and said delta slope.

15. The method of claim 14, wherein said starting slope equals a negative ten percent grade, said ending slope equals a positive ten percent grade, and said delta slope equals the quotient of the difference between said ending slope and said starting slope divided by a number of pen picture iterations for said coach mark.

16. The method of claim 1, wherein said coach mark is circular in shape.

17. The method of claim 16, wherein the automatically drawing step (b) comprises the steps of:

defining a starting point, a minor axis, and a major axis, and plotting pen pictures starting from said starting point in accordance with said minor axis and said major axis.

18. The method of claim 17, wherein the plotting step comprises the step of plotting pen pictures in accordance with $x = \pm a * (1-(y^2/b^2))^{1/2}$, where a is a length of said major axis and b is a length of said minor axis.

19. The method of claim 17, wherein said minor axis has an original length and wherein the automatically drawing step (b) comprises the steps of:

extending said minor axis to produce an extended minor axis, plotting pen pictures for a first quadrant of said coach mark in accordance with said extended minor axis and said major axis, resizing said extended minor axis to the original length to produce a resized minor axis, and plotting pen pictures for a second quadrant, a third quadrant, and a fourth quadrant of said coach mark in accordance with said resized minor axis and said major axis.

20. The method of claim 1, wherein said coach mark is X-shaped.

21. The method of claim 20, wherein the automatically drawing step (b) comprises the steps of:

defining a first starting point and a first ending point for a first leg of said coach mark, calculating a first starting slope, a first ending slope, and a first delta slope, and plotting pen pictures on said display from said first starting point to said first ending point in accordance with said first starting slope, said first ending slope, and said first delta slope.

22. The method of claim 21, wherein the defining step comprises the steps of:

defining an item rectangle to be highlighted with said coach mark, initially defining said first starting point at a first corner of said item rectangle and said first ending point at a second corner of said item rectangle, and randomly adjusting said first starting point and said first ending point such that said first starting point and said first ending point are defined outside said item rectangle.

23. The method of claim 21, wherein:

said first starting slope=(delta Y/delta X)/2, said first ending slope=(delta Y/delta X)* 2, delta Y is a vertical distance between said first starting point and said first ending point, delta X is a horizontal distance between said first starting point and said first ending point, and said first delta slope equals the quotient of the difference between said first ending slope and said first starting slope divided by a number of pen picture iterations for said coach mark.

24. The method of claim 21, wherein the automatically drawing step (b) comprises the steps of:

defining a second starting point and a second ending point for a second leg of said coach mark, calculating a second starting slope, a second ending slope, and a second delta slope, and plotting pen pictures on said display from said second starting point to said second ending point in accordance with said second starting slope, said second ending slope, and said second delta slope.

25. A data processing display system for providing visual cues to a user, said data processing display system comprising:

a display; and a data processing system, coupled to said display, for displaying on said display a user interface having a plurality of objects;

said data processing system automatically drawing on said display a coach mark having at least one geometric shape to visually identify at least one of said objects on said user interface to said user, wherein said coach mark is formed from a plurality of pen pictures, wherein each of said plurality of pen pictures is a pixel map including at least two vertically aligned pixels and at least two horizontally aligned pixels, said data processing system automatically drawing said coach mark by:

(i) drawing on said display an initial pen picture for said coach mark, and (ii) iteratively drawing on said display additional pen pictures for said coach mark over time until said coach mark has been fully rendered on said display.

26. The display system of claim 25, wherein said data processing system iteratively draws on said display said additional pen pictures such that said additional pen pictures overlap one another.

27. The display system of claim 25, wherein said initial pen picture and each of said additional pen pictures are rectangular in shape.

28. The display system of claim 25, wherein said coach mark identifies a location on said display for data input by said user.

29. The display system of claim 25, wherein said coach mark is displayed in color.

30. The display system of claim 25, wherein said coach mark is translucent.

31. The display system of claim 25, wherein said data processing system draws said coach mark in response to said user providing a first signal to said data processing system.

32. The display system of claim 31, wherein said data processing system draws said coach mark in response to said user providing said first signal by inputting a help inquiry to said data processing system.

33. The display system of claim 25, wherein said data processing system displays at least one of said objects in a window on said display.

34. The display system of claim 33, wherein said coach mark identifies one of said at least one object within said window.

35. The display system of claim 25, wherein said coach mark is shaped as an arrow.

36. The display system of claim 35, wherein said data processing system draws said coach mark by:
defining a starting point and an ending point for a shaft of said coach mark,
calculating a starting slope, an ending slope, and a delta slope for said shaft,
plotting pen pictures on said display from said starting point to said ending point in accordance with said starting slope, said ending slope, and said delta slope,
calculating a first arrowhead slope and a second arrowhead slope for an arrowhead of said coach mark, and
plotting pen pictures on said display in accordance with said first arrowhead slope and said second arrowhead slope.

37. The display system of claim 25, wherein said coach mark is linear in shape.

38. The display system of claim 37, wherein said data processing system draws said coach mark by:
defining a starting point and an ending point,
calculating a starting slope, an ending slope, and a delta slope, and
plotting pen pictures on said display from said starting point to said ending point in accordance with said starting slope, said ending slope, and said delta slope.

39. The display system of claim 38, wherein said starting slope equals a negative ten percent grade, said ending slope equals a positive ten percent grade, and said delta slope equals the quotient of the difference between said ending slope and said starting slope divided by a number of pen picture iterations for said coach mark.

40. The display system of claim 25, wherein said coach mark is circular in shape.

41. The display system of claim 40, wherein said data processing system draws said coach mark by:
defining a starting point, a minor axis, and a major axis, and
plotting pen pictures starting from said starting point in accordance with said minor axis and said major axis.

42. The display system of claim 41, wherein said data processing system plots pen pictures in accordance with $x = \pm a * (1-(y^2/b^2))^{1/2}$, where a is a length of said major axis and b is a length of said minor axis.

43. The display system of claim 41, wherein said minor axis has an original length and wherein said data processing system plots pen pictures by:
extending said minor axis to produce an extended minor axis,
plotting pen pictures for a first quadrant of said coach mark in accordance with said extended minor axis and said major axis,
resizing said extended minor axis to the original length to produce a resized minor axis, and
plotting pen pictures for a second quadrant, a third quadrant, and a fourth quadrant of said coach mark in accordance with said resized minor axis and said major axis.

44. The display system of claim 25, wherein said coach mark is X-shaped.

45. The display system of claim 44, wherein said data processing system draws said coach mark by:
defining a first starting point and a first ending point for a first leg of said coach mark,
calculating a first starting slope, a first ending slope, and a first delta slope, and
plotting pen pictures on said display from said first starting point to said first ending point in accordance with said first starting slope, said first ending slope, and said first delta slope.

46. The display system of claim 45, wherein said data processing system defines said first starting point and said first ending point by:
defining an item rectangle to be highlighted with said coach mark,
initially defining said first starting point at a first corner of said item rectangle and said first ending point at a second corner of said item rectangle, and
randomly adjusting said first starting point and said first ending point such that said first starting point and said first ending point are defined outside said item rectangle.

47. The display system of claim 45, wherein:
said first starting slope=(delta Y/delta X)/2,
said first ending slope=(delta Y/delta X)* 2,
delta Y is a vertical distance between said first starting point and said first ending point,
delta X is a horizontal distance between said first starting point and said first ending point, and
said first delta slope equals the quotient of the difference between said first ending slope and said first starting slope divided by a number of pen picture iterations for said coach mark.

48. The display system of claim 45, wherein said data processing system draws said coach mark by:
defining a second starting point and a second ending point for a second leg of said coach mark,
calculating a second starting slope, a second ending slope, and a second delta slope, and
plotting pen pictures on said display from said second starting point to said second ending point in accordance with said second starting slope, said second ending slope, and said second delta slope.

* * * * *